United States Patent
Guo et al.

(10) Patent No.: US 12,117,696 B2
(45) Date of Patent: Oct. 15, 2024

(54) PIXEL ELECTRODE, PIXEL STRUCTURE, DISPLAY PANEL AND DISPLAY DEVICE

(71) Applicants: Wuhan BOE Optoelectronics Technology Co., Ltd., Hubei (CN); BOE Technology Group Co., Ltd., Beijing (CN)

(72) Inventors: Yuanhui Guo, Beijing (CN); Wei Zhang, Beijing (CN); Xia Shi, Beijing (CN); Yujie Gao, Beijing (CN); Yang Hu, Beijing (CN)

(73) Assignees: Wuhan BOE Optoelectronics Technology Co., Ltd., Hubei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/775,722

(22) PCT Filed: Apr. 8, 2021

(86) PCT No.: PCT/CN2021/085996
§ 371 (c)(1),
(2) Date: May 10, 2022

(87) PCT Pub. No.: WO2021/232986
PCT Pub. Date: Nov. 25, 2021

(65) Prior Publication Data
US 2024/0152006 A1  May 9, 2024

(30) Foreign Application Priority Data
May 19, 2020 (CN) .......................... 202010423750.5

(51) Int. Cl.
G02F 1/1343 (2006.01)
G02F 1/1337 (2006.01)

(52) U.S. Cl.
CPC .. *G02F 1/134309* (2013.01); *G02F 1/133707* (2013.01); *G02F 1/134363* (2013.01); *G02F 1/134381* (2021.01)

(58) Field of Classification Search
CPC ......... G02F 1/134363; G02F 1/134381; G02F 1/133707
See application file for complete search history.

(56) References Cited

U.S. PATENT DOCUMENTS

| | | | | |
|---|---|---|---|---|
| 2001/0007490 A1* | 7/2001 | Ohta | ................. | G02F 1/134363 349/139 |
| 2002/0126241 A1* | 9/2002 | Kurahashi | ......... | G02F 1/134363 349/114 |

(Continued)

FOREIGN PATENT DOCUMENTS

| CN | 1374546 A | 10/2002 |
|---|---|---|
| CN | 103488002 A | 1/2014 |

(Continued)

OTHER PUBLICATIONS

CN202010423750.5 first office action.
CN202010423750.5 Notification to grant patent right for invention.

*Primary Examiner* — Jessica M Merlin
(74) *Attorney, Agent, or Firm* — IPro, PLLC

(57) ABSTRACT

Provided is a pixel electrode. The pixel electrode includes a first electrode, the first electrode being a strip-shaped electrode; and a plurality of second electrodes, wherein each of the second electrodes is a strip-shaped electrode and is connected to the first electrode, and the plurality of second electrodes are arranged along an extending direction of the first electrode; wherein a length of the first electrode is greater than a length of any one of the second electrodes, and a width of the first electrode is greater than a width of any one of the second electrodes.

17 Claims, 20 Drawing Sheets

(56) References Cited

U.S. PATENT DOCUMENTS

| | | |
|---|---|---|
| 2007/0024789 A1 | 2/2007 | Itou et al. |
| 2010/0231544 A1 | 9/2010 | Lu et al. |
| 2013/0120680 A1 | 5/2013 | Sun et al. |
| 2013/0242221 A1 | 9/2013 | Nishida et al. |
| 2013/0300994 A1 | 11/2013 | Wu et al. |
| 2015/0108486 A1* | 4/2015 | Um .................. G02F 1/1368 257/72 |
| 2016/0054618 A1 | 2/2016 | Rossini |
| 2016/0187746 A1 | 6/2016 | Yue et al. |
| 2016/0187749 A1 | 6/2016 | Ma et al. |

FOREIGN PATENT DOCUMENTS

| | | |
|---|---|---|
| CN | 104503161 A | 4/2015 |
| CN | 104536215 A | 4/2015 |
| CN | 107678212 A | 2/2018 |
| CN | 110376803 A | 10/2019 |
| CN | 111505870 A | 8/2020 |
| EP | 2990867 A1 | 3/2016 |
| JP | 2007034151 A | 2/2007 |

\* cited by examiner

PIXEL ELECTRODE, PIXEL STRUCTURE, DISPLAY PANEL AND DISPLAY DEVICE

CROSS-REFERENCE TO RELATED APPLICATION

The present disclosure is a US national stage of international application No. PCT/CN2021/085996, filed on Apr. 8, 2021, which claims priority to Chinese Patent Application No. 202010423750.5, filed on May 19, 2020 and entitled "PIXEL ELECTRODE, PIXEL STRUCTURE, DISPLAY PANEL AND DISPLAY DEVICE", the contents of which are herein incorporated by reference in their entireties.

TECHNICAL FIELD

The present disclosure relates to the field of display technologies, and in particular, relates to a pixel electrode, a pixel structure, a display panel and a display device.

BACKGROUND

Liquid crystal display (LCD) panels are widely used in large-sized display devices due to lower power consumption.

SUMMARY

The present disclosure provides a pixel electrode, a pixel structure, a display panel and a display device. The technical solutions are as follows.

In an aspect, a pixel electrode is provided. The pixel electrode includes:
  a first electrode, the first electrode being a strip-shaped electrode; and
  a plurality of second electrodes, wherein each of the second electrodes is a strip-shaped electrode and is connected to the first electrode, and the plurality of second electrodes are arranged along an extending direction of the first electrode;
  wherein a length of the first electrode is greater than a length of any one of the second electrodes, and a width of the first electrode is greater than a width of any one of the second electrodes.

Optionally, the first electrode includes a first sub-electrode, a second sub-electrode, and a third sub-electrode, wherein
  one end of the first sub-electrode is connected to one end of the second sub-electrode, and the other end of the second sub-electrode is connected to one end of the third sub-electrode; and
  an extending direction of the second sub-electrode is intersected with an extending direction of the first sub-electrode and an extending direction of the third sub-electrode, and the first sub-electrode and the third sub-electrode are disposed on different sides of the second sub-electrode.

Optionally, the extending direction of the first sub-electrode is parallel to the extending direction of the third sub-electrode.

Optionally, a first angle between the second sub-electrode and the first sub-electrode is equal to a second angle between the second sub-electrode and the third sub-electrode.

Optionally, both the first angle between the second sub-electrode and the first sub-electrode and the second angle between the second sub-electrode and the third sub-electrode are greater than or equal to 90 degrees.

Optionally, the plurality of second electrodes include a plurality of first-type second electrodes and a plurality of second-type second electrodes, wherein
  one end of each of the first-type second electrodes is connected to the first sub-electrode; and
  one end of each of the second-type second electrodes is connected to the third sub-electrode.

Optionally, each of the first-type second electrodes is extended in a first direction, and each of the second-type second electrodes is extended in a second direction, the first direction being intersected with or parallel to the second direction.

Optionally, an angle between the first direction and a gate line and an angle between the second direction and the gate line range from 7 degrees to 20 degrees.

Optionally, the plurality of second electrodes further include a plurality of third-type second electrodes, wherein
  one end of each of the third-type second electrodes is connected to the second sub-electrode.

Optionally, the plurality of third-type second electrodes are disposed on a side, close to the first sub-electrode, of the second sub-electrode, the extending direction of the second sub-electrode is intersected with the first direction, each of the third-type second electrodes is extended in a third direction, and the third direction is parallel to the first direction;
  or the plurality of third-type second electrodes are disposed on a side, close to the third sub-electrode, of the second sub-electrode, and the extending direction of the second sub-electrode is intersected with the second direction, each of the third-type second electrodes is extended in a third direction, and the third direction is parallel to the second direction.

Optionally, the first electrode is linear; and
  a middle portion or an end portion of each of the second electrodes is connected to the first electrode.

Optionally, the plurality of second electrodes include a plurality of fourth-type second electrodes and a plurality of fifth-type second electrodes, wherein
  each of the fourth-type second electrodes is extended in a fourth direction, and each of the fifth-type second electrodes is extended in a fifth direction, the fourth direction being intersected with or parallel to the fifth direction.

Optionally, an angle between the fourth direction and a gate line and an angle between the fifth direction and the gate line range from 7 degrees to 20 degrees.

Optionally, the extending direction of the first electrode is parallel to or intersected with a data line.

Optionally, the width of the first electrode is greater than or equal to 2.3 μm and less than or equal to 3 μm, and the width of each of the second electrodes is greater than or equal to 1.3 μm and less than or equal to 2.2 μm.

In another aspect, a pixel structure is provided. The pixel structure includes a common electrode, a liquid crystal layer, and the pixel electrode described in the above aspect.

The common electrode and the pixel electrode are configured to drive liquid crystals in the liquid crystal layer to deflect.

Optionally, the common electrode and the pixel electrode are disposed on a same side of the liquid crystal layer; and
  the pixel electrode is disposed between the common electrode and the liquid crystal layer, or the common electrode is disposed between the pixel electrode and the liquid crystal layer.

Optionally, the liquid crystals in the liquid crystal layer are negative liquid crystals.

In still another aspect, a display panel is provided. The display panel includes a base substrate, and a plurality of pixel structures described in the above aspect and disposed on the base substrate.

Optionally, extending directions of the plurality of second electrodes in the pixel electrode in each of the pixel structures are the same, and the extending directions of the second electrodes in the pixel electrodes in two adjacent pixel structures are intersected with each other.

In still another aspect, a display device is provided. The display device includes a drive circuit and the display panel described in the above aspect.

The drive circuit is configured to provide a driving signal for a pixel structure in the display panel.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions and advantages in the present disclosure, the embodiments of the present disclosure are described in detail below in combination with the accompanying drawings.

In the related art, in order to increase the transmittance of a display panel, the pixel electrode in the liquid crystal display panel is generally designed as a bent strip-shaped electrode.

However, if the strip-shaped electrode is designed to be narrower, the strip-shaped electrode is prone to fracture, which affects the normal display of the display panel. If the strip-shaped electrode is designed to be wider, although the risk of fracture may be reduced, the transmittance of the display panel cannot be effectively increased.

A thin film transistor-liquid crystal display (TFT-LCD) panel is a display panel acquired by combining a thin film transistor (TFT) and a liquid crystal display panel by adopting a microelectronic fine processing technology. That is, the microelectronic fine processing performed on Si is transferred onto large-area glass to process a TFT array, the acquired array substrate with TFTs is aligned with another color film substrate with a color film layer, and then subsequent processes such as attaching a polarizer are performed to acquire the liquid crystal display panel.

The liquid crystal display panel includes a plurality of pixel structures. Each pixel structure may include a pixel electrode, and the transmittance of the display panel is negatively correlated with the area of the pixel electrode. That is, the larger the area of the pixel electrode is, the lower the transmittance of the display panel is; and the smaller the area of the pixel electrode is, the higher the transmittance of the display panel is.

Figure 1:
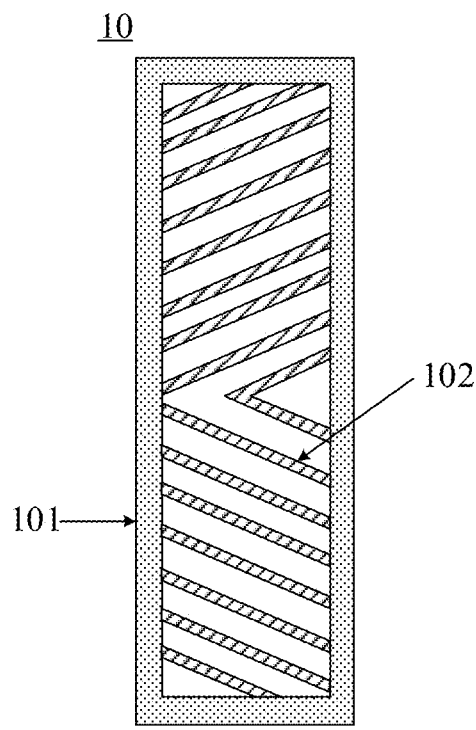
FIG. 1 is a structural schematic diagram of a pixel electrode in the related art.

In the related art, as shown in FIG. 1, the pixel electrode 10 may include a ring-shaped structure 101 and a strip-shaped structure 102 disposed in the ring-shaped structure 101 and connected to the ring-shaped structure 101. In addition, the ring-shaped structure 101 is usually set to be relatively wide to avoid fracture of the ring-shaped structure 101, and the strip-shaped structure 102 is usually set to be relatively narrow to increase the transmittance of the display panel. Therefore, the length of the ring-shaped structure 101 usually affects the transmittance of the display panel.

For display panels of the same size, in the case that the resolution of the display panel is lower, the area occupied by each pixel structure in the display panel is larger, the sum of the circumference of the ring-shaped structures 101 in the pixel electrodes 10 in all the pixel structures may be smaller, and the transmittance of the display panel is higher. In the case that the resolution of the display panel is higher, the area occupied by each pixel structure in the display panel is smaller, the sum of the circumference of the ring-shaped structures 101 in the pixel electrodes 10 in all the pixel structures is larger, and the transmittance of the display panel is lower.

Figure 2:
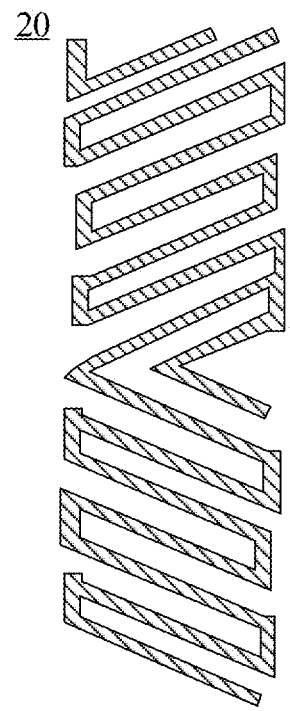
FIG. 2 is a structural schematic diagram of another pixel electrode in the related art.

Therefore, in order to increase the transmittance of the display panel, as shown in FIG. 2, the pixel electrode 20 may be designed as a bent strip-shaped electrode. The transmittance of the display panel may be increased by 3% to 6%. However, as the pixel electrode 20 has a longer length and narrower width, the pixel electrode 20 is prone to fracture, which affects the normal display of the display panel. If the pixel electrode 20 is set to be wider, although the risk of fracture may be reduced, the transmittance of the display panel cannot be effectively increased.

Figure 3:
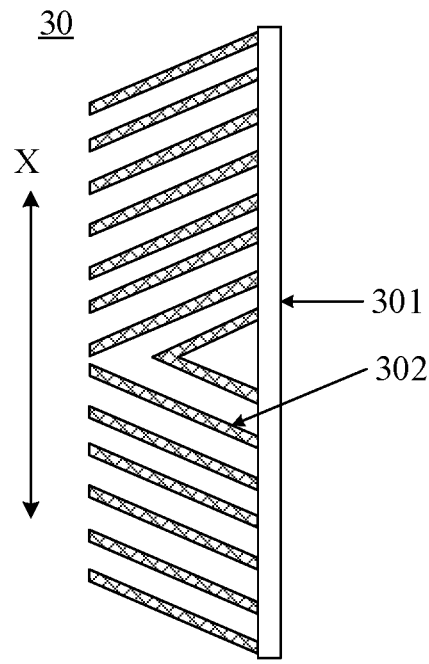
FIG. 3 is a structural schematic diagram of a pixel electrode according to an embodiment of the present disclosure.

FIG. 3 is a structural schematic diagram of a pixel electrode according to an embodiment of the present disclosure. The pixel electrode 30 can solve the problems of easy fracture and low transmittance in the related art. With reference to FIG. 3, the pixel electrode 30 may include a first electrode 301 and a plurality of second electrodes 302.

The first electrode 301 and the plurality of second electrodes 302 all may be strip-shaped electrodes. Each of the second electrodes 302 may be connected to the first electrode 301, and the plurality of second electrodes 302 are arranged along an extending direction X of the first electrode 301. The length of the first electrode 301 is greater than the length of any of the second electrodes 302, and the width of the first electrode 301 is greater than the width of any of the second electrodes 302.

That is, the plurality of second electrodes 302 with a narrower width and shorter length are connected through the first electrode 301 with a wider width and longer length, thereby conducting the electrodes.

In summary, the embodiment of the present disclosure provides a pixel electrode. The pixel electrode includes the first electrode with a longer length and wider width and the plurality of second electrodes with a narrower width and shorter length which are connected to the first electrode. As the first electrode is wider, even if the first electrode is longer, the first electrode is not prone to fracture. In addition, as the plurality of second electrodes are connected through the first electrode with the longer length and wider width and the second electrodes are shorter, even if the second electrodes are set to be narrower, the second electrodes are not prone to fracture. Therefore, the pixel electrode according to the embodiment of the present disclosure can effectively increase the transmittance of the display panel on the premise of ensuring the low risk of fracture.

In the embodiment of the present disclosure, the width of the first electrode 301 may be greater than or equal to 2.3 μm and less than or equal to 3 μm. That is, the first electrode 301 is neither too narrow nor too wide. On the one hand, the first electrode 301 is prevented from fracture due to the too narrow width of the first electrode 301, and on the other hand, the transmittance of the display panel is prevented from being affected by the too wide width of the first electrode 301.

In addition, the width of the second electrode 302 may be greater than or equal to 1.3 μm and less than or equal to 2.2 μm. That is, the width of the second electrode 302 may be less than the width of the first electrode 301, and the width of the second electrode 302 is not too small, which can prevent the second electrode 302 from fracture on the premise of increasing the transmittance of the display panel.

Figure 4:
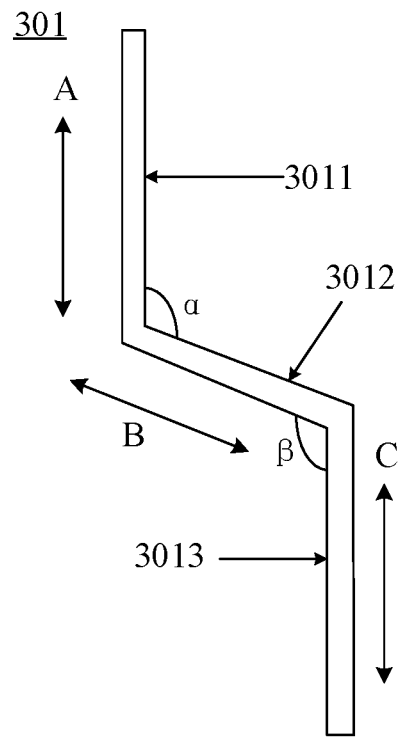
FIG. 4 is a structural schematic diagram of a first electrode according to an embodiment of the present disclosure.

FIG. 4 is a structural schematic diagram of a first electrode according to an embodiment of the present disclosure. With reference to FIG. 4, it can be seen that the first electrode 301 may include a first sub-electrode 3011, a second sub-electrode 3012, and a third sub-electrode 3013. One end of the first sub-electrode 3011 may be connected to one end of the second sub-electrode 3012, and the other end of the second sub-electrode 3012 may be connected to one end of the third sub-electrode 3013.

With reference to FIG. 4, the extending direction B of the second sub-electrode 3012 may be intersected with the extending direction A of the first sub-electrode 3011 and the extending direction C of the third sub-electrode 3013, and the first sub-electrode 3011 and the third sub-electrode 3013 are disposed on different sides of the second sub-electrode 3012. For example, with reference to FIG. 4, the first electrode 301 may be of a Z-shaped structure.

As the extending direction B of the second sub-electrode 3012 is intersected with the extending direction A of the first sub-electrode 3011 and the extending direction C of the third sub-electrode 3013, the extending direction B of the second sub-electrode 3012 is not collinear with the extending direction A of the first sub-electrode 3011 and the extending direction C of the third sub-electrode 3013. In addition, with reference to FIG. 5, since signal lines (such as data lines) are usually disposed on two sides of the pixel electrode 30, the extending directions of the three sub-electrodes are not collinear with one another. In this way, the first electrode 301 is prevented from being closer to one of two signal lines and being farther from the other of the two signal lines, thereby avoiding the larger coupling capacitance between the first electrode 301 and the signal line closer to the first electrode 301 and the smaller coupling capacitance between the first electrode 301 and the signal line farther from the first electrode 301, i.e., the big difference of the coupling capacitance of various regions of the display panel. Thus, the display effect of the display panel is prevented from being affected In addition, the first sub-electrode 3011 and the third sub-electrode 3013 are disposed on different sides of the second sub-electrode 3012 respectively, such that the second electrodes 302 connected to the first electrode 301 may be distributed uniformly on different sides of the second sub-electrode 3012 and the pixel electrode 30 has better symmetry. Thus, the display panel has relatively high uniformity of transmittance.

It should be noted that the extending direction A of the first sub-electrode 3011 may be parallel to the extending direction C of the third sub-electrode 3013, such that the overall structure of the pixel electrode 30 is symmetrical and the display effect of the display panel is better. Certainly, due to the limitation of the manufacturing process, the extending direction A of the first sub-electrode 3011 may not be exactly parallel to the extending direction C of the third sub-electrode 3013. Therefore, in the embodiment of the present disclosure, the angle between the extending direction A of the first sub-electrode 3011 and the extending direction C of the third sub-electrode 3013 may be within an angle threshold range. The angle threshold range may be 0-10 degrees.

In the embodiment of the present disclosure, a first angle α between the second sub-electrode 3012 and the first sub-electrode 3011 may be equal to a second angle β between the second sub-electrode 3012 and the third sub-electrode 3013, to ensure the symmetry of the overall structure of the pixel electrode, thereby ensuring the uniformity of transmittance of various regions of the display panel.

With reference to FIG. 4, it can be seen that both the first angle α between the second sub-electrode 3012 and the first sub-electrode 3011 and the second angle β between the second sub-electrode 3012 and the third sub-electrode 3013 may be greater than or equal to 90 degrees. For example, both the first angle α and the second angle β may be 100 degrees.

In the embodiment of the present disclosure, by setting the first angle α between the second sub-electrode 3012 and the first sub-electrode 3011 and the second angle β between the second sub-electrode 3012 and the third sub-electrode 3013 to be larger, the length of the second sub-electrode 3012 is prevented from being larger due to the smaller first angle α and second angle β. Therefore, the total length of the first electrode 301 is prevented from being larger, and the transmittance of the display panel is prevented from being affected.

Figure 5:
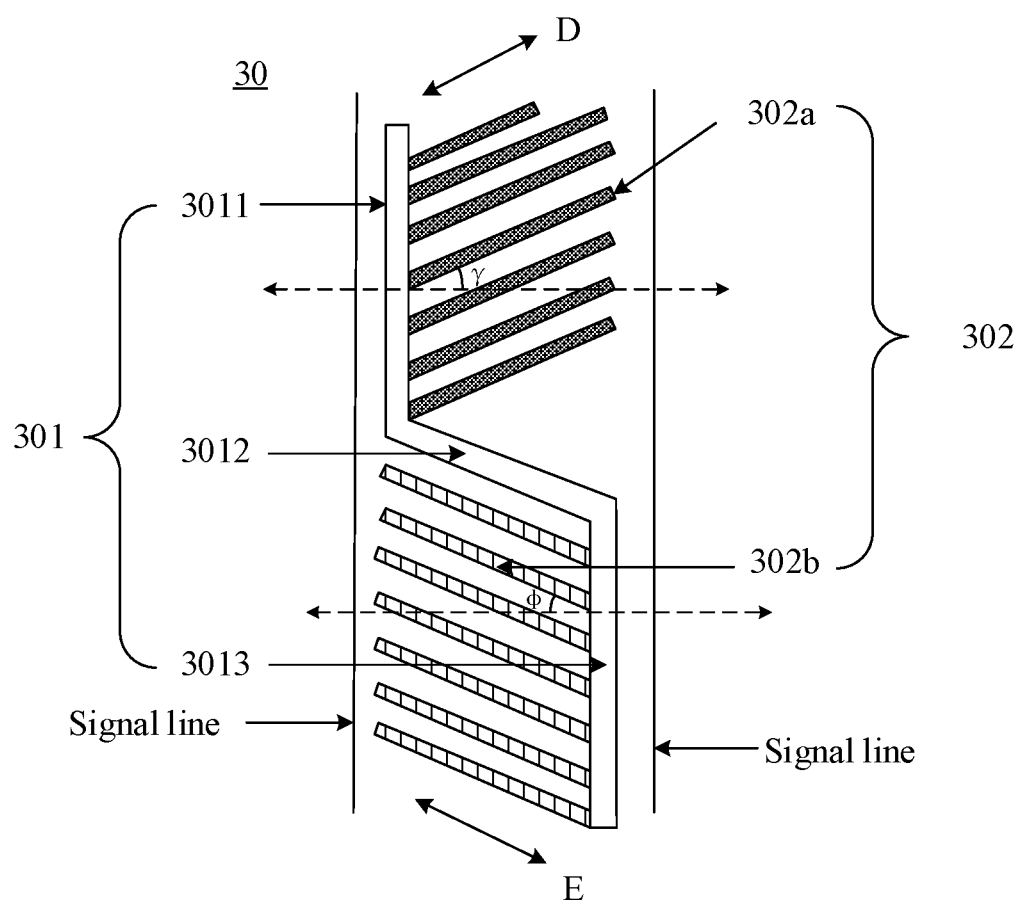
FIG. 5 is a structural schematic diagram of another pixel electrode according to an embodiment of the present disclosure.

With reference to FIG. 5, it can be seen that the plurality of second electrodes 302 may include a plurality of first-type second electrodes 302a and a plurality of second-type second electrodes 302b.

With reference to FIG. 5, one end of each of the first-type second electrodes 302a may be connected to the first sub-electrode 3011, and the other end of the each of the first-type second electrodes 302a is not connected to any sub-electrode in the first-electrode 301. One end of each of the second-type second electrodes 302b may be connected to the third sub-electrode 3013, and the other end of each of the second-type second electrodes 302b is not connected to any sub-electrode in the first-electrode 301.

That is, one end of each of the first-type second electrodes 302a is connected to the first electrode 301 and one end of each of the second-type second electrodes 302b is connected to the first electrode 301 to conduct each second electrode 302 with the first electrode 301. There is no need to connect the other end of each second electrode 302 to the first electrode 301, to prevent the length of the first electrode 301 from being too large, thereby preventing affecting the transmittance of the display panel.

With reference to FIG. 5, it can be further seen that each of the first-type second electrodes 302a may extend in a first direction D and each of the second-type second electrodes 302b may extend in a second direction E. The first direction D may be intersected with the second direction E, to align liquid crystals in the liquid crystal layer. Certainly, with reference to FIG. 6, the first direction D may be parallel to the second direction E, which is not limited in the embodiments of the present disclosure.

In the embodiment of the present disclosure, an angle γ between the first direction D and a gate line may range from 7 degrees to 20 degrees and an angle φ between of the second direction E and the gate line may range from 7 degrees to 20 degrees. That is, the angle γ and the angle φ are neither too small nor too large.

It should be noted that the long axes of liquid crystals may be parallel to the gate line when the liquid crystals in the liquid crystal layer are not deflected, and the long axes of the liquid crystals may be perpendicular to the extending direction of the second electrode 302 after the liquid crystals are deflected. That is, the liquid crystals in the region of the first-type second electrodes 302a may be deflected until the long axes are perpendicular to the extending direction D of the first-type second electrodes 302a, and the liquid crystals in the region of the second-type second electrodes 302b may be deflected until the long axes are perpendicular to the extending direction E of the second-type second electrodes 302b.

Therefore, in the case that the angle γ and the angle φ are set to be smaller, the liquid crystals need to deflect a larger angle, which results in delay of displaying an image by the display panel. In the case that the angle γ and the angle φ are set to be larger, the liquid crystals need to deflect a too small angle, and it is difficult to determine the deflection direction of the liquid crystals when the liquid crystals are deflected and it takes a long time to determine the deflection direction, which results in delay of displaying an image by the display panel.

With reference to FIG. 5, it can be seen that the angle between the first-type second electrode 302a and the second sub-electrode 3012 may be greater than the angle between the second-type second electrode 302b and the second sub-electrode 3012. For example, the extending direction E of the second-type second electrode 302b may be parallel to the extending direction B of the second sub-electrode 3012, that is, the angle between the second-type second electrode 302b and the second sub-electrode 3012 may be 0 degree and the angle between the first-type second electrode 302a and the second sub-electrode 3012 may be γ+φ.

Figure 7:
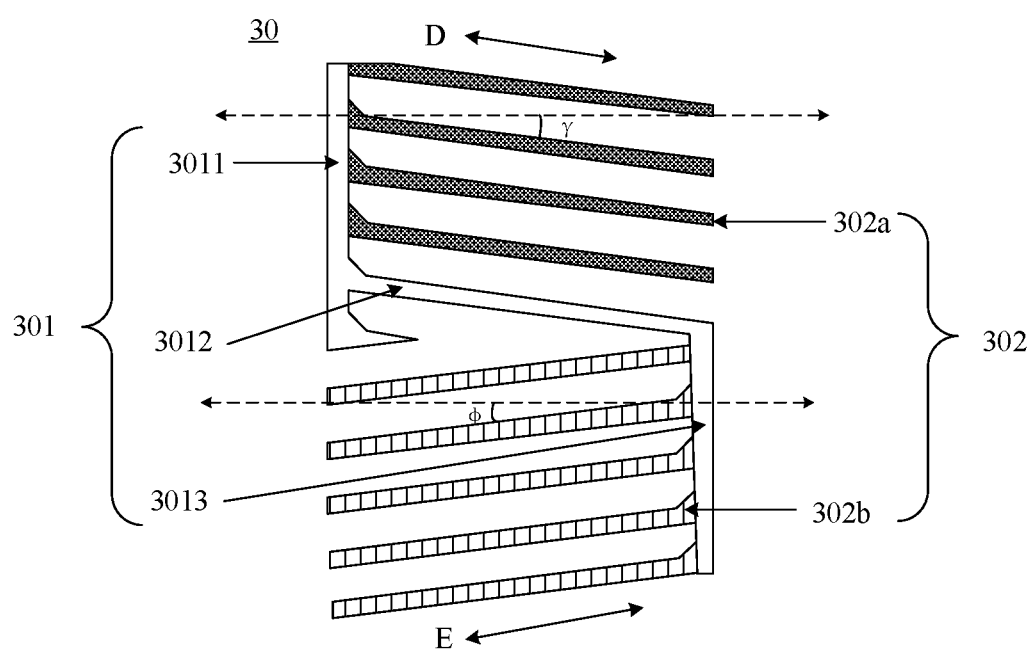
FIG. 7 is a structural schematic diagram of still another pixel electrode according to an embodiment of the present disclosure.

Certainly, with reference to FIG. 7, the angle between the second-type second electrode 302b and the second sub-electrode 3012 may be greater than the angle between the first-type second electrode 302a and the second sub-electrode 3012. For example, the extending direction D of the first-type second electrode 302a may be parallel to the extending direction B of the second sub-electrode 3012, that is, the angle between the first-type second electrode 302a and the second sub-electrode 3012 may be 0 degree and the angle between the second-type second electrode 302b and the second sub-electrode 3012 may be γ+φ.

Figure 8:
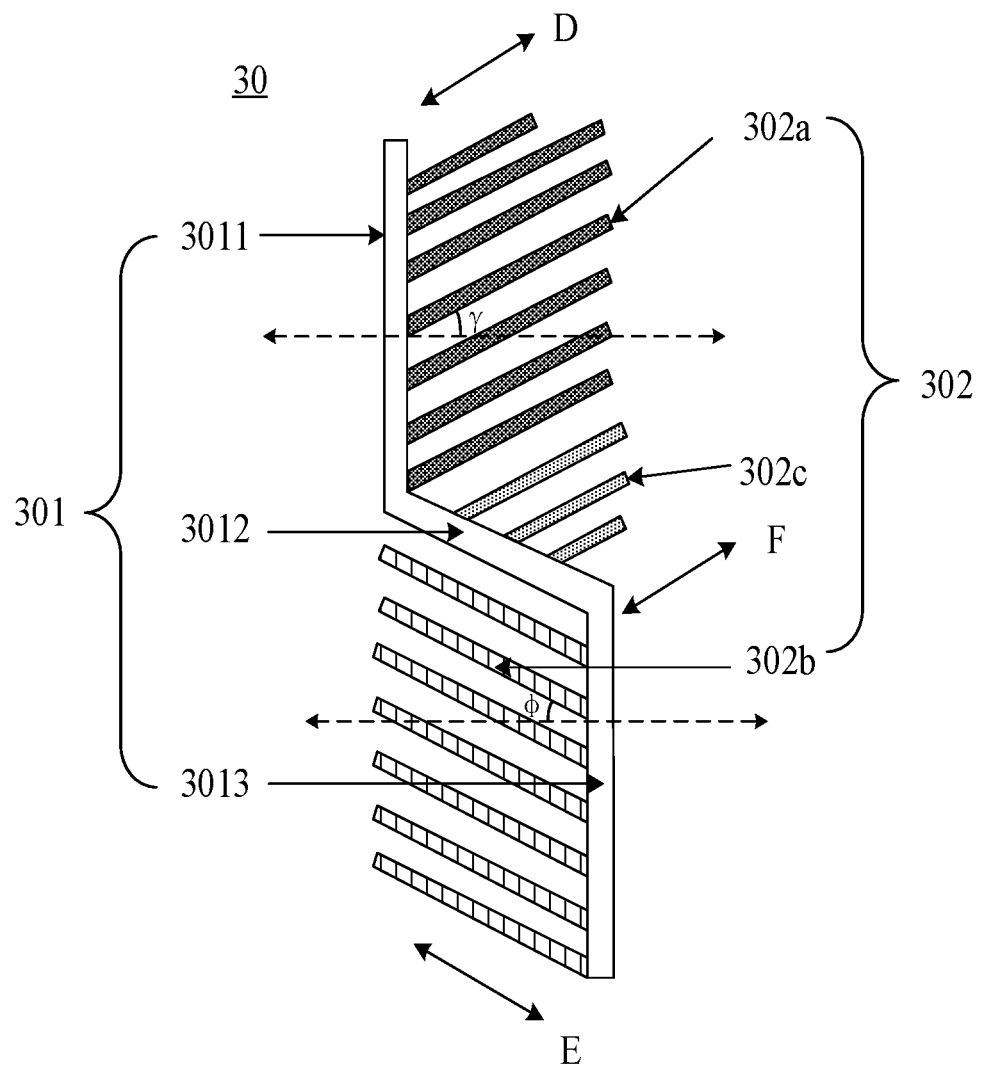
FIG. 8 is a structural schematic diagram of still another pixel electrode according to an embodiment of the present disclosure.

FIG. 8 is a structural schematic diagram of still another pixel electrode according to an embodiment of the present disclosure. With reference to FIG. 8, it can be seen that the plurality of second electrodes 302 may further include a plurality of third-type second electrodes 302c. One end of each of the third-type second electrodes 302c may be connected to the second sub-electrode 3012.

In an optional implementation, with reference to FIG. 8, the plurality of third-type second electrodes 302c may be disposed on the side, close to the first sub-electrode 3011, of the second sub-electrode 3012. The extending direction B of the second sub-electrode 3012 may be intersected with the first direction D, each of the third-type second electrodes 302c may be extended in a third direction F, and the third direction F may be parallel to the first direction D.

Since the extending direction B of the second sub-electrode 3012 is intersected with the first direction D, that is, the extending direction B of the second sub-electrode 3012 is not parallel to the first direction D, the third direction F being parallel to the first direction D does not cause the third direction F to be parallel to the extending direction B of the second sub-electrode 3012, which ensures that one end of the third-type second electrode 302c is connected to the second sub-electrode 3012.

Figure 9:
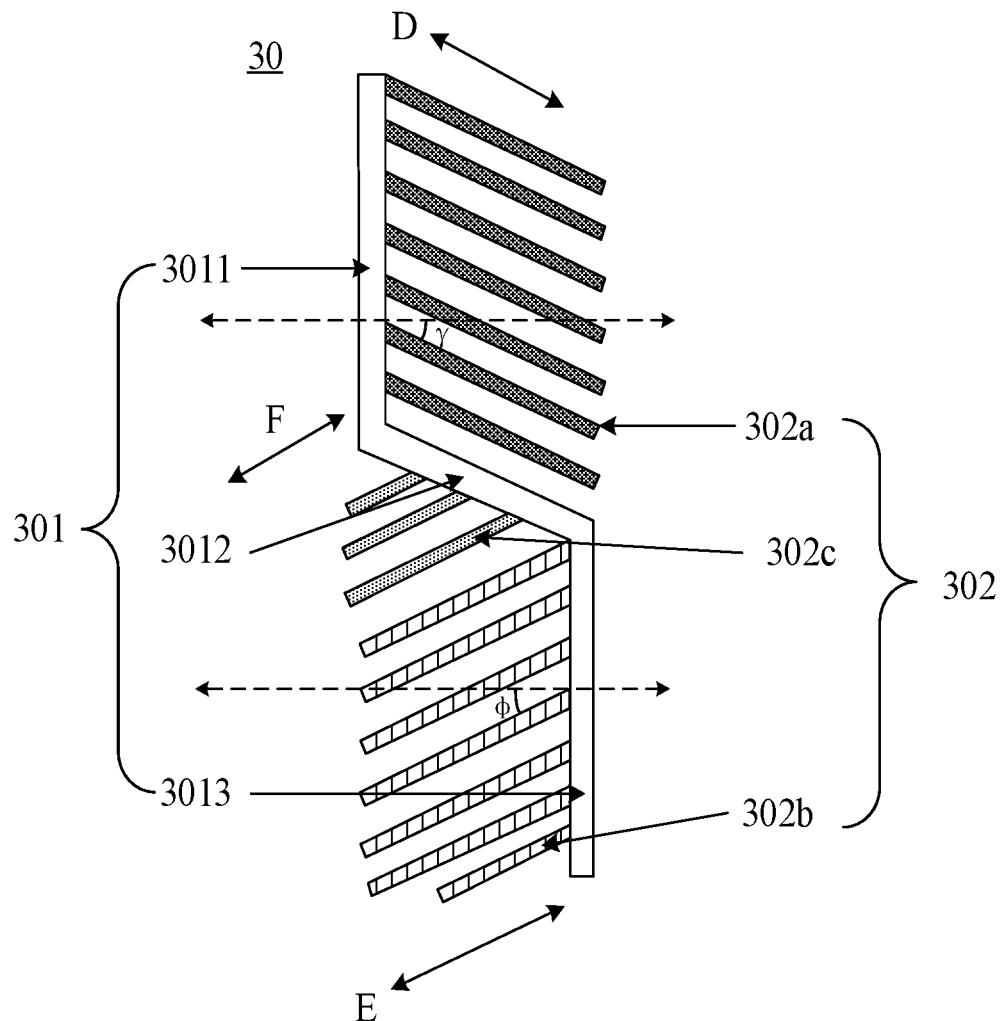
FIG. 9 is a structural schematic diagram of still another pixel electrode according to an embodiment of the present disclosure.

In another optional implementation, with reference to FIG. 9, the plurality of third-type second electrodes 302c may be disposed on the side, close to the third sub-electrode 3013, of the second sub-electrode 3012. The extending direction B of the second sub-electrode 3012 may be intersected with the second direction E, each of the third-type second electrodes 302c may be extended in the third direction F, and the third direction F may be parallel to the second direction E.

Since the extending direction B of the second sub-electrode 3012 is intersected with the second direction E, that is, the extending direction B of the second sub-electrode 3012 is not parallel to the second direction E, the third direction F being parallel to the second direction E does not cause the third direction F to parallel to the extending direction B of the second sub-electrode 3012, which ensures that one end of the third-type second electrode 302c is connected to the second sub-electrode 3012.

It should be noted that with reference to FIG. 4 to FIG. 9, for the scenario that the first electrode 301 includes the first sub-electrode 3011, the second sub-electrode 3012 and the third sub-electrode 3013 which are connected in sequence and the extending direction A of the first sub-electrode 3011, the extending direction B of the second sub-electrode 3012 and the extending direction C of the third sub-electrode 3013 are not collinear with one another, the plurality of second electrodes 302 being arranged along the extending direction of the first electrode 301 may refer to that the plurality of second electrodes 302 all are arranged along the extending direction A of the first sub-electrode 3011 or along the extending direction C of the third sub-electrode 3013; or part of the second electrodes 302 are arranged along the extending direction A of the first sub-electrode 3011 and part of the second electrodes 302 are arranged along the extending direction C of the third sub-electrode 3013; or part of the second electrodes 302 are arranged along the extending direction A of the first sub-electrode 3011, part of the second electrodes 302 are arranged along the extending direction B of the second sub-electrode 3012 and part of the second electrodes 302 are arranged along the extending direction C of the third sub-electrode 3013.

For example, with reference to FIG. 8, the first-type second electrodes 302a are arranged along the extending direction A of the first sub-electrode 3011, the third-type second electrodes 302c are arranged along the extending direction B of the second sub-electrode 3012, and the second-type second electrodes 302b are arranged along the extending direction C of the third sub-electrode 3013.

In the embodiments of the present disclosure, the comparison of various parameters of the pixel electrode 10 shown in FIG. 1, the pixel electrode 20 shown in FIG. 2, the pixel electrode 30 shown in FIG. 3, and the pixel electrode 30 shown in FIG. 8 may be as shown in table 1.

TABLE 1

| | | Pixel electrode | | | |
| --- | --- | --- | --- | --- | --- |
| | | Pixel electrode shown in FIG. 1 | Pixel electrode shown in FIG. 2 | Pixel electrode shown in FIG. 3 | Pixel electrode shown in FIG. 8 |
| | | Driving voltage | | | |
| | | 8 V | 8 V | 8 V | 8 V |
| | | Transmittance | | | |
| | | 100% | 111.9% | 110.5% | 112.1% |
| | | Risk of fracture | | | |
| | | Low | High | Low | Low |
| Coupling capacitance between the pixel electrode and the signal line | Coupling capacitance between the first side of the pixel electrode and the signal line | 5.14E−15 | 4.24E−15 | 3.63E−15 | 4.24E−15 |
| | Coupling capacitance between the second side of the pixel electrode and the signal line | 5.66E−15 | 4.85E−15 | 5.15E−15 | 4.38E−15 |

With reference to table 1, it can be seen that the driving voltage of each of the pixel electrode 10 shown in FIG. 1, the pixel electrode 20 shown in FIG. 2, the pixel electrode 30 shown in FIG. 3, and the pixel electrode 30 shown in FIG. 8 is 8 V. In addition, assuming that the transmittance of the display panel to which the pixel electrode 10 shown in FIG. 1 belongs is 100%, then the transmittance of the display panel to which the pixel electrode 20 shown in FIG. 2 belongs is 111.9%, the transmittance of the display panel to which the pixel electrode 30 shown in FIG. 3 belongs is 110.5%, and the transmittance of the display panel to which the pixel electrode 30 shown in FIG. 8 belongs is 112.1%.

As the pixel electrode 10 shown in FIG. 1 includes the ring-shaped electrode 101 and the strip-shaped electrode 102 connected to the ring-shaped electrode 101 and the ring-shaped electrode 101 is wider, even if the ring-shaped electrode 101 is set to be longer, the ring-shaped electrode 101 is not prone to fracture. In addition, the strip-shaped electrode 102 is shorter, even if the strip-shaped electrode 102 is set to be narrower, the strip-shaped electrode 102 is not prone to fracture. That is, the pixel electrode 10 shown in FIG. 1 has a lower risk of fracture.

Since the pixel electrode 20 shown in FIG. 2 is a bent strip-shaped electrode and is longer and narrower, the pixel electrode 20 is prone to fracture. That is, the pixel electrode 20 shown in FIG. 2 has a higher risk of fracture.

As the pixel electrode 30 shown in each of FIG. 3 and FIG. 8 includes the first electrode 301 and the plurality of second electrodes 302 and the first electrode 301 is wider, even if the first electrode 301 is set to be longer, the first electrode 301 is not prone to fracture. In addition, as each of the plurality of second electrodes 302 is shorter, even if the second electrode 302 is set to be narrower, the strip-shaped electrode 302 is not prone to fracture. That is, the pixel electrodes 30 shown in FIG. 3 and FIG. 8 have a lower risk of fracture, a high yield, and thus the display panel has better quality.

Since the display panel includes signal lines that transmit signals, the coupling capacitance is generated between the pixel electrode and the signal line, which affects the display effect of the display panel. For example, the signal line may be a data line configured to transmit a data signal to the pixel electrode.

In the embodiments of the present disclosure, the coupling capacitance between each of the pixel electrode 10 shown in FIG. 1, the pixel electrode 20 shown in FIG. 2, the pixel electrode 30 shown in FIG. 3 and the pixel electrode 30 shown in FIG. 8 and the signal line is tested. With reference to table 1, the coupling capacitance (C) between the first side (e.g., the left side) of the pixel electrode 10 shown in FIG. 1 and the signal line is $5.14E^{-15}$ F (Farads), and the coupling capacitance between the second side (e.g., the right side) of the pixel electrode 10 shown in FIG. 1 and the signal line is 5.66E-15 F. The coupling capacitance between the first side (e.g., the left side) of the pixel electrode 20 shown in FIG. 2 and the signal line is 4.24E-15 F, and the coupling capacitance between the second side (e.g., the right side) of the pixel electrode 20 shown in FIG. 2 and the signal line is 4.85E-15 F. The coupling capacitance between the first side (e.g., the left side) of the pixel electrode 30 shown in FIG. 3 and the signal line is 3.63E-15 F, and the coupling capacitance between the second side (e.g., the right side) of the pixel electrode 30 shown in FIG. 3 and the signal line is 5.15-15 F. The coupling capacitance between the first side (e.g., the left side) of the pixel electrode 30 shown in FIG. 8 and the signal line is 4.24E-15 F, and the coupling capacitance between the second side (e.g., the right side) of the pixel electrode 30 shown in FIG. 8 and the signal line is 4.38E-15 F.

That is, the coupling capacitance between one side of each of the pixel electrode 10 shown in FIG. 1, the pixel electrode 20 shown in FIG. 2, and the pixel electrode 30 shown in FIG. 8 and the signal line approximates the coupling capacitance between the other side thereof and the signal line, which can ensure the display uniformity of the display panel. For the pixel electrode 30 shown in FIG. 3, the coupling capacitance between the left side of the pixel electrode 30 and the signal line is greatly different from the coupling capacitance between the right side of the pixel electrode 30 and the signal line, which affects the display uniformity of the display panel.

From the above analysis, it can be known that for the pixel electrode 30 in FIG. 3 and the pixel electrode 30 in FIG. 8 according to the embodiments of the present disclosure, the coupling capacitance between one side of the pixel electrode 30 in FIG. 8 and the signal line is slightly different from the coupling capacitance between the other side of the pixel electrode 30 in FIG. 8 and the signal line, and thus the display uniformity of the display panel is better.

It should be noted that the minimum circumscribed polygon of the pixel electrode 30 according to the embodiments of the present disclosure may be a rectangle. For example, for the pixel electrode 30 shown in FIG. 8, the first perpendicular distances between the other ends of the plurality of first-type second electrodes 302a and the first sub-electrode 3011, and the first perpendicular distances between the other ends of the plurality of third-type second electrodes 303c and the first sub-electrode 3011 are all equal, and the second perpendicular distances between the other ends of the plurality of second-type second electrodes 302b and the third sub-electrode 3013 are equal. In addition, the first perpendicular distance is equal to the second perpendicular distance.

For the pixel electrode 30 shown in FIG. 9, the first perpendicular distances between the other ends of the plurality of first-type second electrodes 302a and the first sub-electrode 3011 are equal, and the second perpendicular distances between the other ends of the plurality of second-type second electrodes 302b and the third sub-electrode 3013 and the second perpendicular distances between the other ends of the plurality of third-type second electrodes 302c and the third sub-electrode 3013 are all equal. In addition, the first perpendicular distance is equal to the second perpendicular distance.

Figure 10:
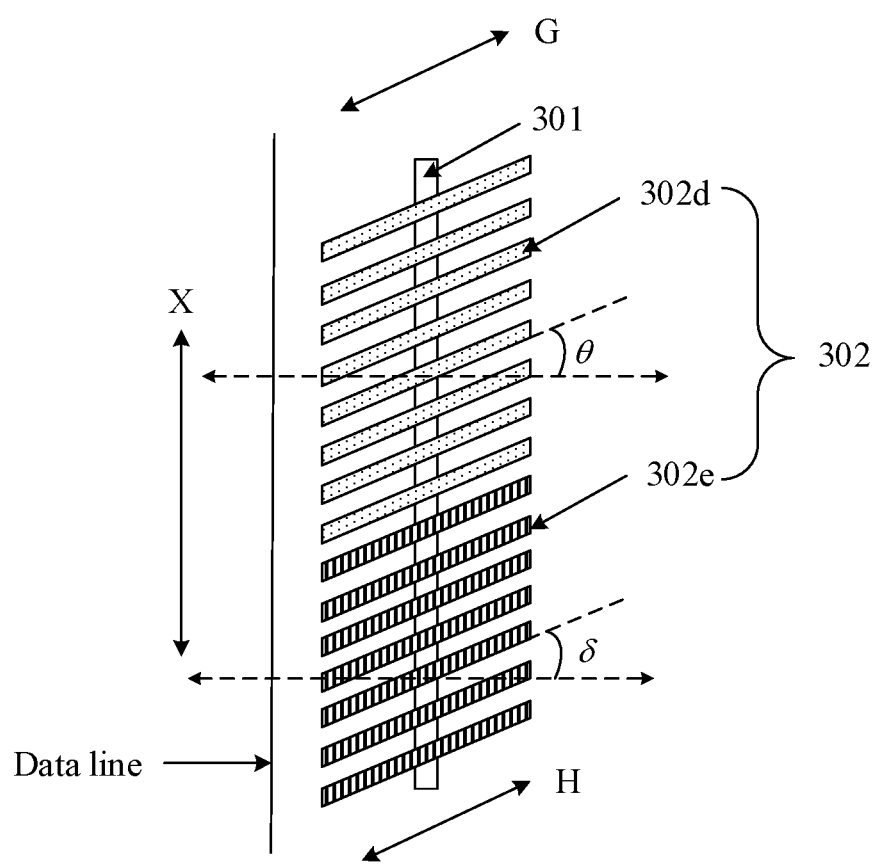
FIG. 10 is a structural schematic diagram of still another pixel electrode according to an embodiment of the present disclosure.

FIG. 10 is a structural schematic diagram of still another pixel electrode according to an embodiment of the present disclosure. With reference to FIG. 10, it can be seen that the first electrode 301 in the pixel electrode 30 may be linear, and the extending direction X of the first electrode 301 may be parallel to a data line. In addition, the middle portion of each of the second electrodes 302 may be connected to the first electrode 301.

Figure 11:
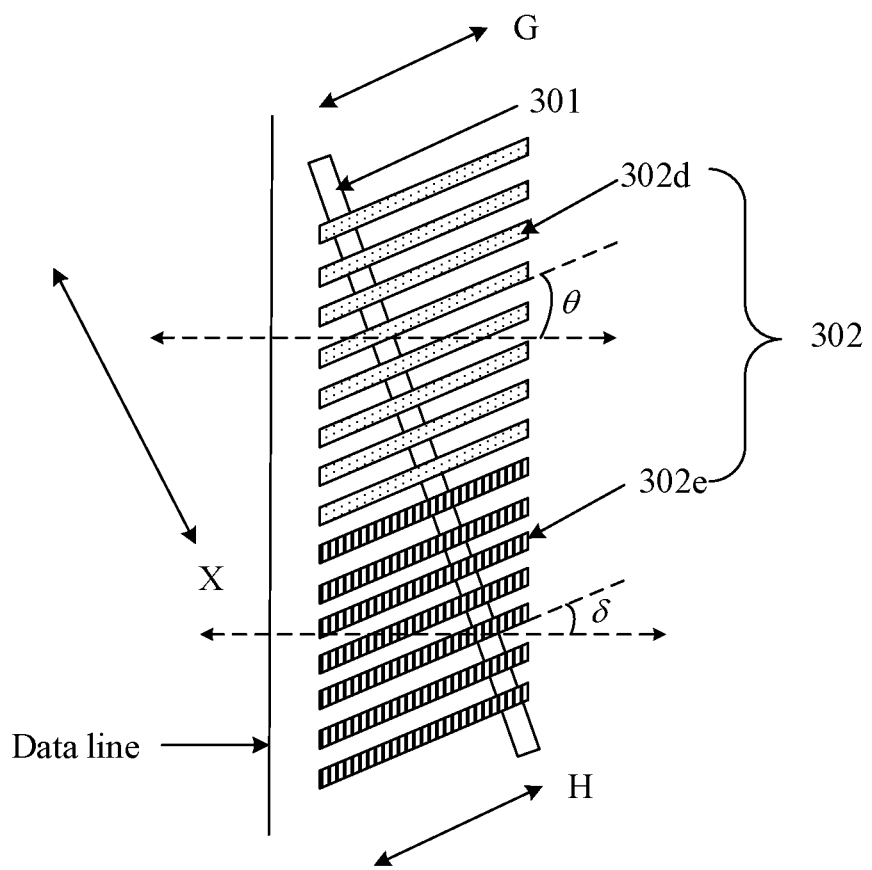
FIG. 11 is a structural schematic diagram of still another pixel electrode according to an embodiment of the present disclosure.

Alternatively, with reference to FIG. 11, the first electrode 301 in the pixel electrode 30 may be linear, and the extending direction X of the first electrode 301 may be intersected with the data line. In addition, the middle portions of part of the second electrodes 302 are connected to the first electrode 301, and the end portions of part of the second electrodes 302 are connected to the first electrode 301.

Figure 12:
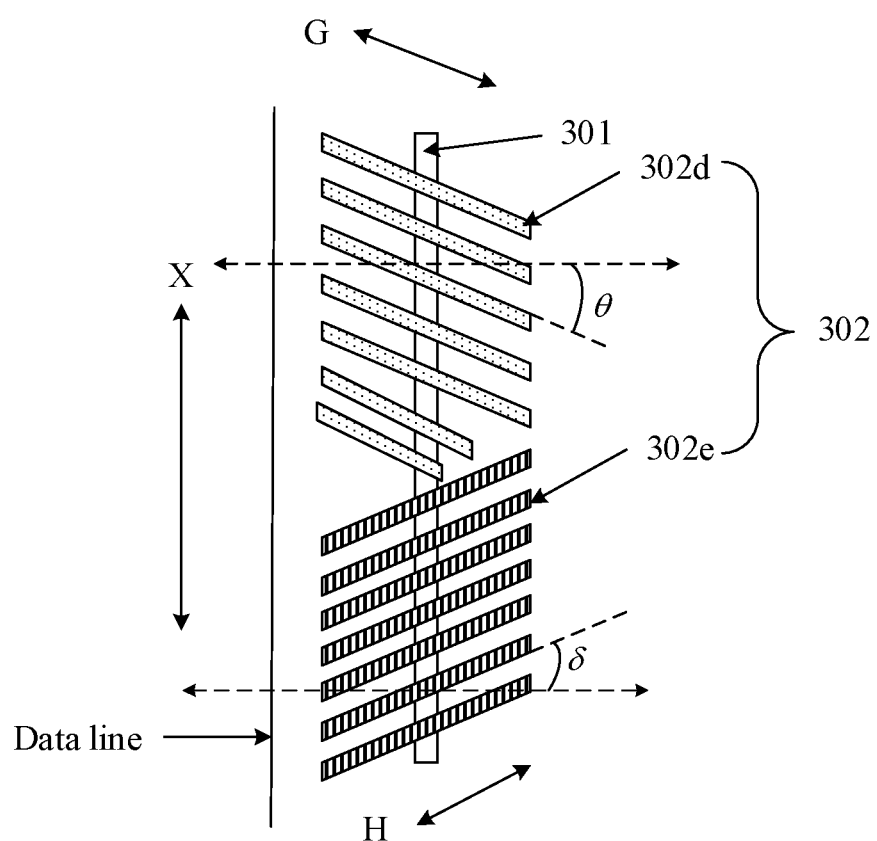
FIG. 12 is a structural schematic diagram of still another pixel electrode according to an embodiment of the present disclosure.
Figure 13:
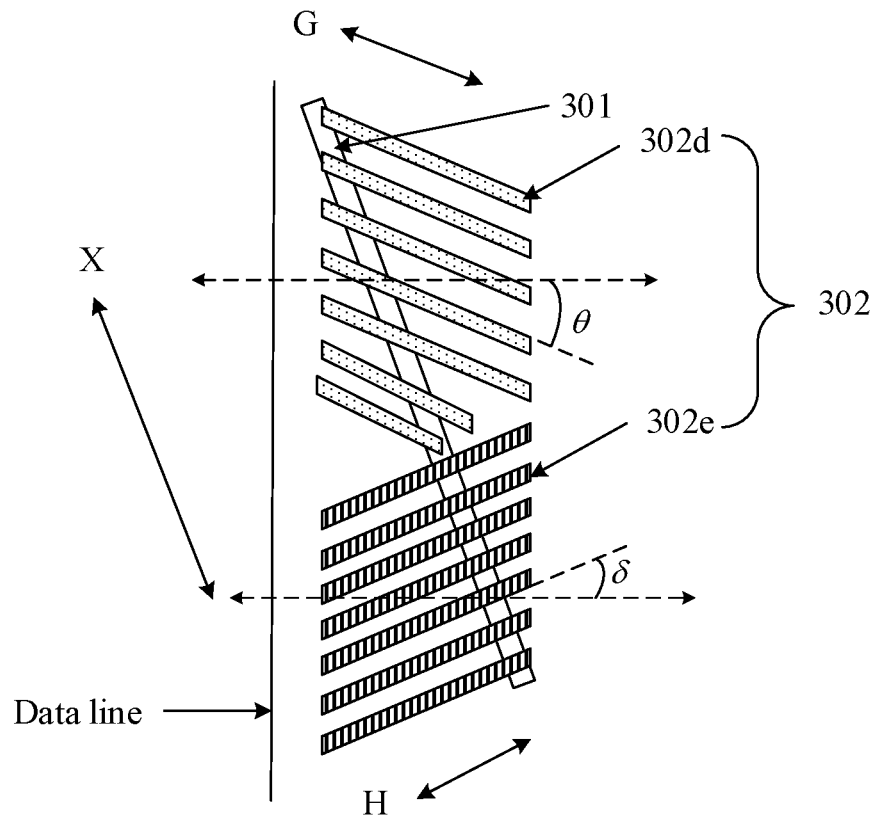
FIG. 13 is a structural schematic diagram of still another pixel electrode according to an embodiment of the present disclosure.

FIG. 12 is a structural schematic diagram of still another pixel electrode according to an embodiment of the present disclosure. FIG. 13 is a structural schematic diagram of still another pixel electrode according to an embodiment of the present disclosure. With reference to FIG. 12 and FIG. 13, it can be seen that the plurality of second electrodes 302 may include a plurality of fourth-type second electrodes 302d and a plurality of fifth-type second electrodes 302e. Each of the fourth-type second electrodes 302d may be extended in a fourth direction G, and each of the fifth-type second electrodes 302e may be extended in a fifth direction H, and the fourth direction G may be intersected with the fifth direction H. Alternatively, with reference to FIG. 10 and FIG. 11, the fourth direction G may be parallel to the fifth direction H. That is, the plurality of second electrodes 302 are all extended in the same direction.

In the embodiments of the present disclosure, the angle θ between the fourth direction G and the gate line may range from 7 degrees to 20 degrees. The angle δ between the fifth direction H and the gate line may range from 7 degrees to 20 degrees. That is, both the angle θ and the angle δ are neither too small nor too large. The gate line is perpendicular to the data line.

It should be noted that the long axes of liquid crystals may be parallel to the gate line when the liquid crystals in a liquid crystal layer are not deflected, and the long axes of the liquid crystals may be perpendicular to the extending direction of the second electrode 302 after the liquid crystals are deflected, that is, the liquid crystals in the region of the fourth-type second electrodes 302d may be deflected until their long axes are perpendicular to the extending direction G of the fourth-type second electrodes 302d, and the liquid crystals in the region of the fifth-type second electrodes 302e may be deflected until their long axes are perpendicular to the extending direction H of the fifth-type second electrodes 302e.

Therefore, in the case that the angle θ and the angle δ are set to be smaller, the liquid crystals need to deflect a larger angle, which results in delay of displaying an image by the display panel. In the case that the angle θ and angle δ are set to be larger, the liquid crystals need to deflect a too small angle, and it is difficult to determine the deflection direction of the liquid crystals when they are deflected, and it takes a long time to determine the deflection direction, which results in delay of displaying an image by the display panel.

In the embodiments of the present disclosure, the comparison of various parameters of the pixel electrode 10 shown in FIG. 1 and the pixel electrode 30 shown in FIG. 10 may be as shown in table 2.

TABLE 2

| | Pixel electrode | |
|---|---|---|
| | Pixel electrode shown in FIG. 1 | Pixel electrode shown in FIG. 10 |
| | Driving voltage | |
| | 8 V | 8 V |
| | Transmittance | |
| | 100% | 106.1% |
| Storing capacitance | 3.14E−12 | 2.14E−12 |
| Coupling capacitance between the pixel electrode and the data line | 5.14E−15 | 3.24E−15 |

With reference to table 2, it can be seen that the driving voltage of each of the pixel electrode 10 shown in FIG. 1 and the pixel electrode 30 shown in FIG. 10 is 8 V. In addition, assuming that the transmittance of the display panel to which the pixel electrode 10 shown in FIG. 1 belongs is 100%, then the transmittance of the display panel to which the pixel electrode 30 shown in FIG. 10 belongs is 106.1%.

Figure 14:
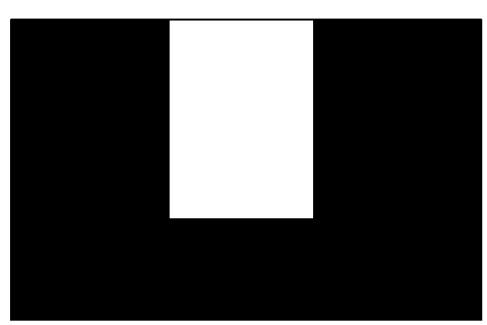
FIG. 14 shows a display effect of a display panel to which the pixel electrode shown in FIG. 1 belongs.
Figure 15:
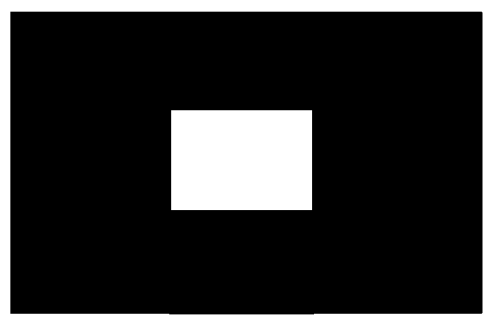
FIG. 15 shows a display effect of a display panel to which the pixel electrode shown in FIG. 10 belongs.

Since the area of the ring-shaped electrode 101 in the pixel electrode 10 shown in FIG. 1 is larger, the storage capacitance between the pixel electrode 10 and the common electrode is larger, resulting in the phenomenon of crosstalk occurring on the display panel as shown in FIG. 14. The first electrode 301 in the pixel electrode 30 shown in FIG. 10 is the linear strip-shaped electrode with a smaller area. Therefore, the storage capacitance between the pixel electrode 30 and the common electrode is smaller, and the display effect of the display panel is as shown in FIG. 15, that is, the phenomenon of crosstalk does not occur, and the display effect of the display panel is better. In addition, since the storage capacitance is smaller, the charging rate of the display panel can be increased.

In the embodiments of the present disclosure, the coupling capacitance between each of the pixel electrode 10 shown in FIG. 1 and the pixel electrode 30 shown in FIG. 10 and the data line is tested. With reference to table 2, the coupling capacitance between the pixel electrode 10 shown in FIG. 1 and the signal line is 5.14E-15 F, and the coupling capacitance between the pixel electrode 30 shown in FIG. 10 and the data line is 3.24E-15 F. That is, the coupling capacitance between the pixel electrode 30 shown in FIG. 10 and the data line is smaller and thus the display effect of the display panel is improved.

In summary, the embodiment of the present disclosure provides a pixel electrode. The pixel electrode includes the first electrode with the longer length and the wider width and the plurality of second electrodes with the narrower width and the shorter length which are connected to the first electrode. As the first electrode is wider, even if the first electrode is longer, the first electrode is not prone to fracture. In addition, as the plurality of second electrodes are connected through the first electrode with the longer length and the wider width, and the second electrodes are shorter, even if the second electrodes are set to be narrower, the second electrodes is not prone to fracture. Therefore, the pixel electrode according to the embodiment of the present disclosure can effectively increase the transmittance of the display panel on the premise of ensuring the low risk of fracture.

Figure 16:
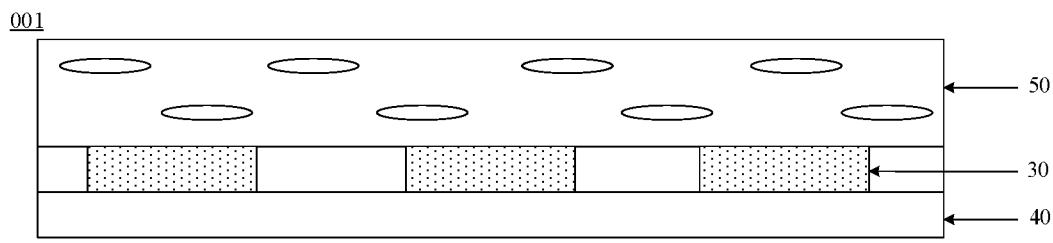
FIG. 16 is a structural schematic diagram of a pixel structure according to an embodiment of the present disclosure.

FIG. 16 is a schematic diagram of a pixel structure according to an embodiment of the present disclosure. With reference to FIG. 16, it can be seen that the pixel structure 001 may include a common electrode 40, a liquid crystal layer 50, and the pixel electrode 30 according to the above embodiment. For example, FIG. 16 shows three pixel electrodes 30.

The common electrode 40 and the pixel electrode 30 may be configured to drive liquid crystals in the liquid crystal layer 50 to deflect.

Figure 17:
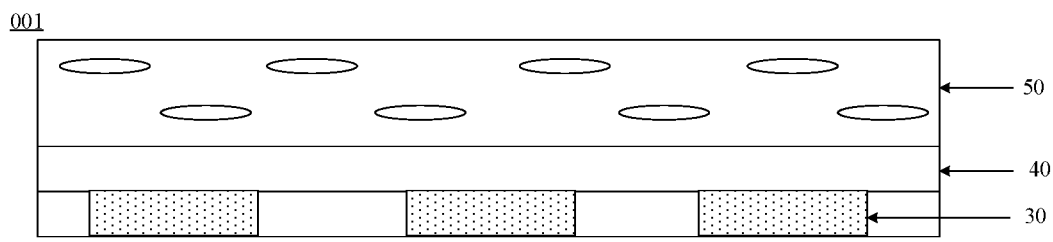
FIG. 17 is a structural schematic diagram of another pixel structure according to an embodiment of the present disclosure.

With reference to FIG. 16, the common electrode 40 and the pixel electrode 30 may be disposed on the same side of the liquid crystal layer 50. In addition, the pixel electrode 30 may be disposed between the common electrode 40 and the liquid crystal layer 50. Alternatively, with reference to FIG. 17, the common electrode 40 may be disposed between the pixel electrode 30 and the liquid crystal layer 50. In the embodiment of the present disclosure, the positions of the common electrode 40 and the pixel electrode 30 are not limited as long as the common electrode 40 and the pixel electrode 30 are disposed on the same side of the liquid crystal layer 50.

Optionally, the liquid crystals in the liquid crystal layer 50 may be negative liquid crystals, which can further increase the transmittance of the display panel. Moreover, the negative liquid crystals have no risk of trace mura. Certainly, the liquid crystals in the liquid crystal layer 50 may also be positive liquid crystals, which is not limited in the embodiment of the present disclosure.

Figure 18:
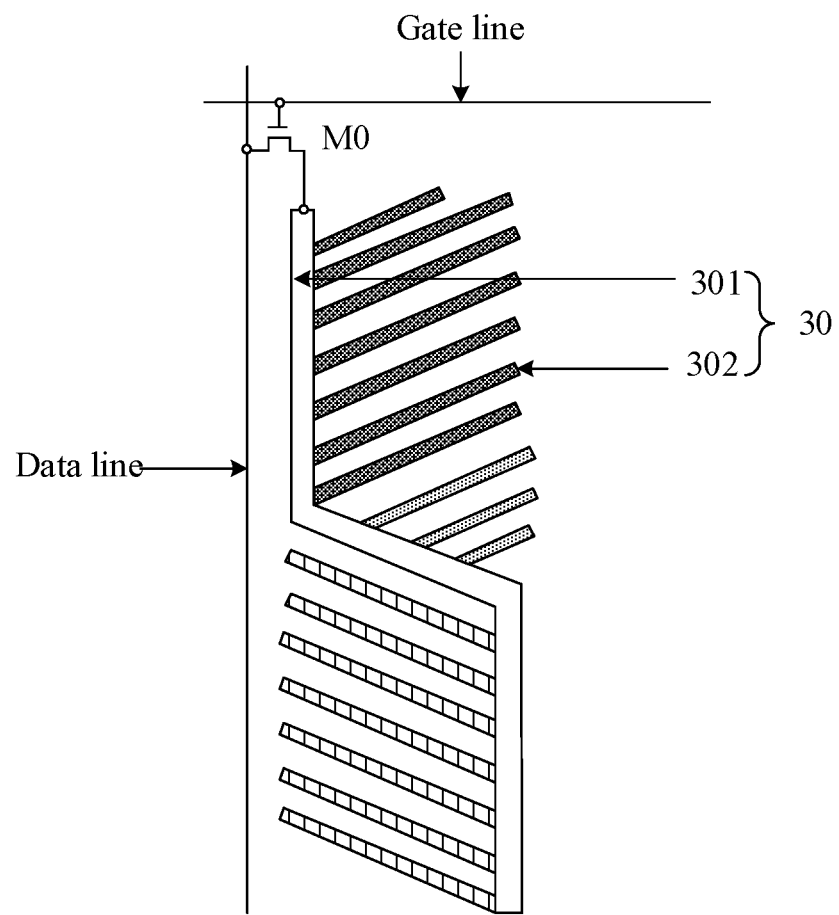
FIG. 18 is a structural schematic diagram of still another pixel structure according to an embodiment of the present disclosure.

FIG. 18 is a structural schematic diagram of still another pixel structure according to an embodiment of the present disclosure. With reference to FIG. 11, it can be seen that the pixel structure 001 may further include a transistor MO. A gate of the transistor MO may be connected to the gate line, a source of the transistor MO may be connected to the data line, and a drain of the transistor MO may be connected to the pixel electrode 30. For example, with reference to FIG. 18, the drain of the transistor MO may be connected to the first electrode 301 of the pixel electrode 30. Certainly, the drain of the transistor MO may also be connected to the second electrode 302 of the pixel electrode 30, which is not limited in the embodiment of the present disclosure.

Figure 19:
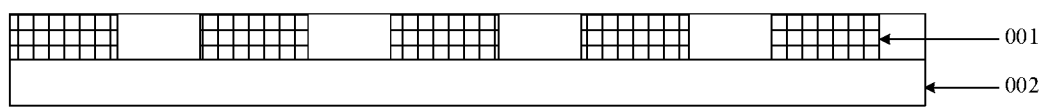
FIG. 19 is a structural schematic diagram of a display panel according to an embodiment of the present disclosure.

FIG. 19 is a structural schematic diagram of a display panel according to an embodiment of the present disclosure. With reference to FIG. 19, it can be seen that the display panel 00 may include a base substrate 002, and the pixel structure 001 according to the above embodiment. For example, 5 pixel structures 001 are shown in FIG. 19.

Figure 20:
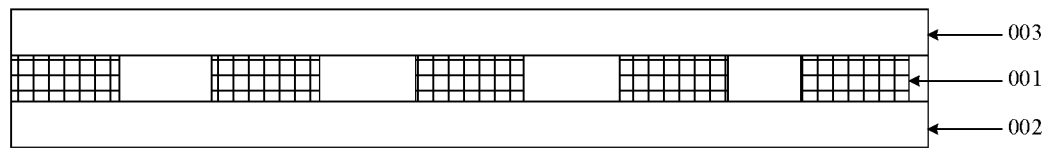
FIG. 20 is a structural schematic diagram of another display panel according to an embodiment of the present disclosure.

FIG. 20 is a structural schematic diagram of another display panel according to an embodiment of the present disclosure. With reference to FIG. 20, it can be seen that the display panel 00 may include a color film substrate 003. The color film substrate 003 may be disposed on the side, away from the base substrate 002, of the pixel structure 001. The color film substrate 003 may be configured to convert light to colored light.

Optionally, the display panel 00 may be a display panel of an advanced super dimension switch (ADS) mode. The display panel of the ADS mode is applicable to the field of large-sized televisions (TV) due to its good viewing angle characteristics and high transmittance. Generally, the higher the pixels per inch (PPI) of the display panel is, the lower the transmittance is. For the display panel of the ADS mode, the higher the PPI is, the lower the transmittance is. Therefore, by adopting the pixel electrode according to the embodiment of the present disclosure, the transmittance of the display panel of the ADS mode which has the higher resolution can be effectively increased.

Figure 21:
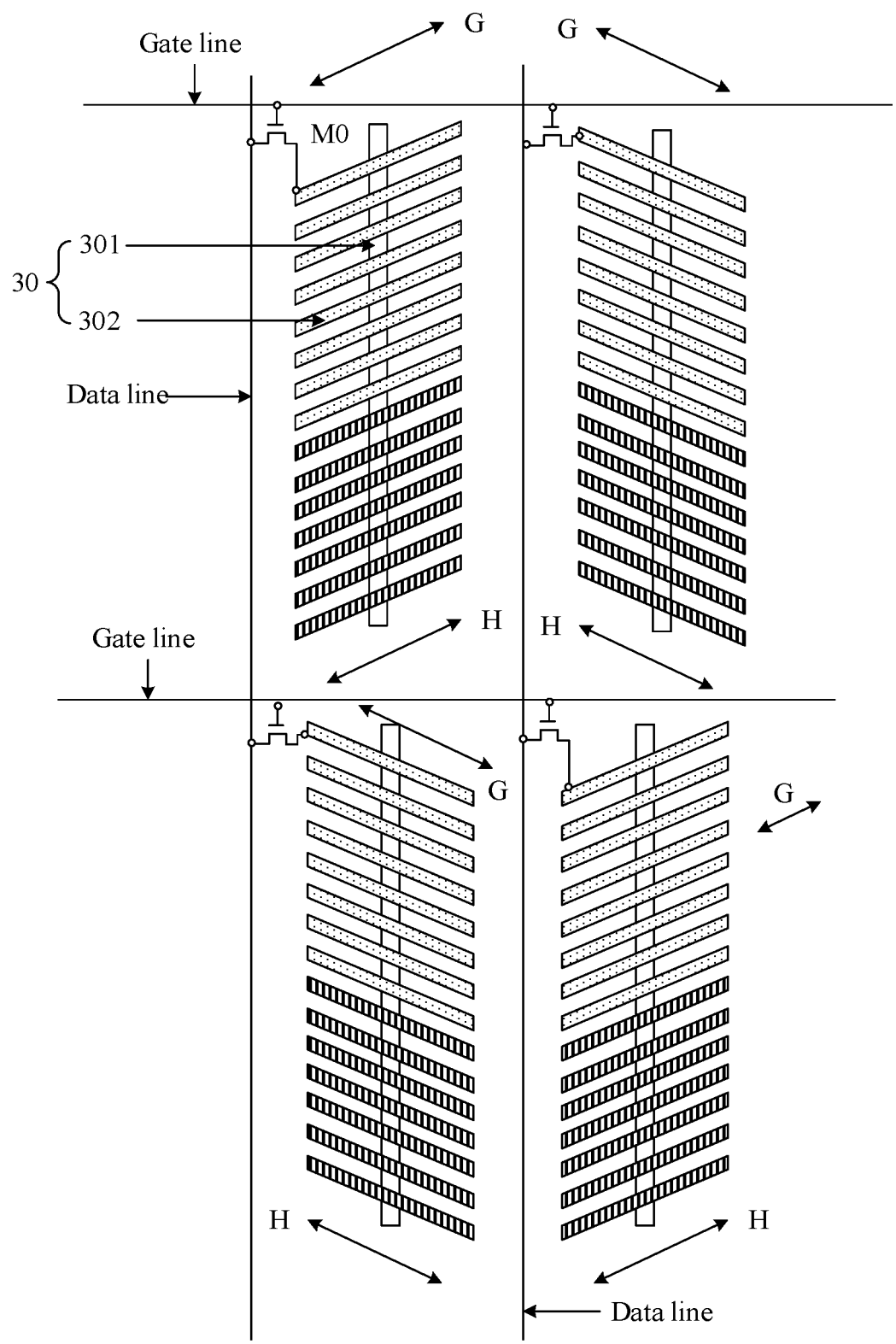
FIG. 21 is a structural schematic diagram of still another display panel according to an embodiment of the present disclosure.
Figure 22:
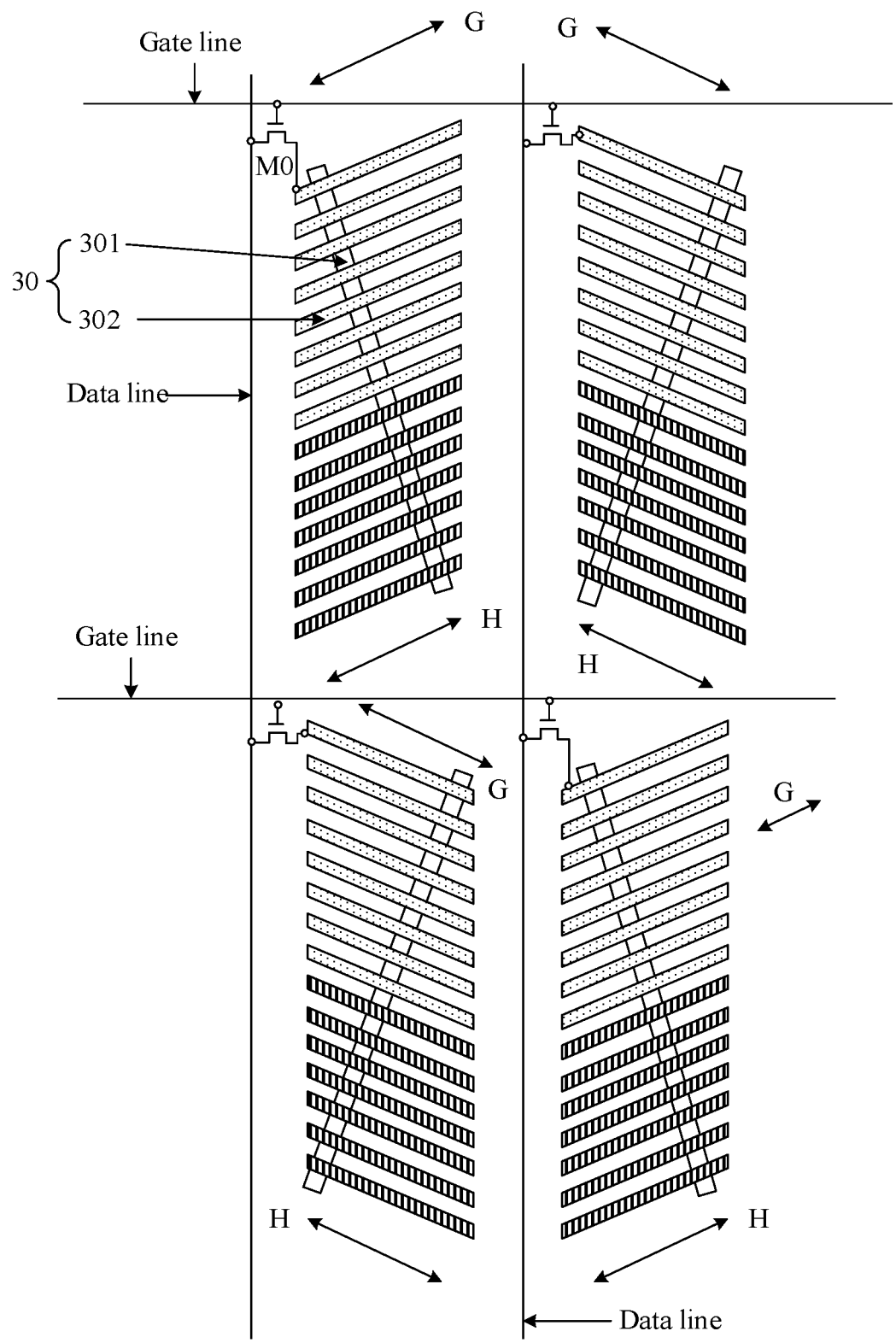
FIG. 22 is a structural schematic diagram of still another display panel according to an embodiment of the present disclosure.

In the embodiment of the present disclosure, FIG. 21 and FIG. 22 show four pixel structures 001 in the display panel. Since the extending directions of the second electrodes 302 in the pixel electrode 30 in each pixel structure 001 are the same (that is, in FIG. 21 and FIG. 22, the extending direction G of the fourth-type second electrodes 302d in each pixel electrode 30 is parallel to the extending direction H of the fifth-type second electrodes 302e in the pixel electrode 30), in order to align liquid crystals in the liquid crystal layer, the extending directions of the second electrodes 302 in the pixel electrodes 30 in the adjacent pixel structures 001 may be intersected with each other. In addition, with reference to FIG. 20, the extending directions of the first electrodes 301 in the pixel electrodes 30 in the adjacent pixel structures 001 may be intersected with each other.

For example, with reference to FIG. 21 and FIG. 22, for two adjacent pixel structures 001, the extending direction of the fourth-type second electrodes 302d of the pixel electrode 30 in the first pixel structure 001 may be intersected with the extending direction of the fourth-type second electrodes 302d of the pixel electrode 30 in the second pixel structure 001, and the extending direction of the fifth-type second electrodes 302e of the pixel electrode 30 in the first pixel structure 001 may be intersected with the extending direction of the fifth-type second electrodes 302e of the pixel electrode 30 in the second pixel structure 001.

Figure 6:
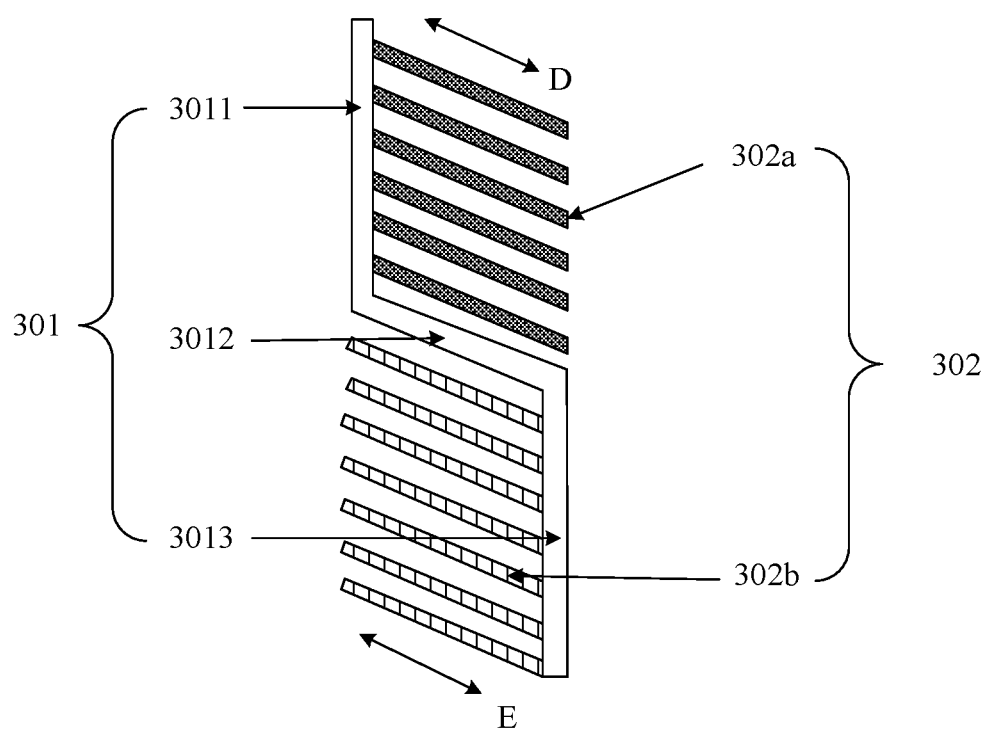
FIG. 6 is a structural schematic diagram of still another pixel electrode according to an embodiment of the present disclosure.
Figure 23:
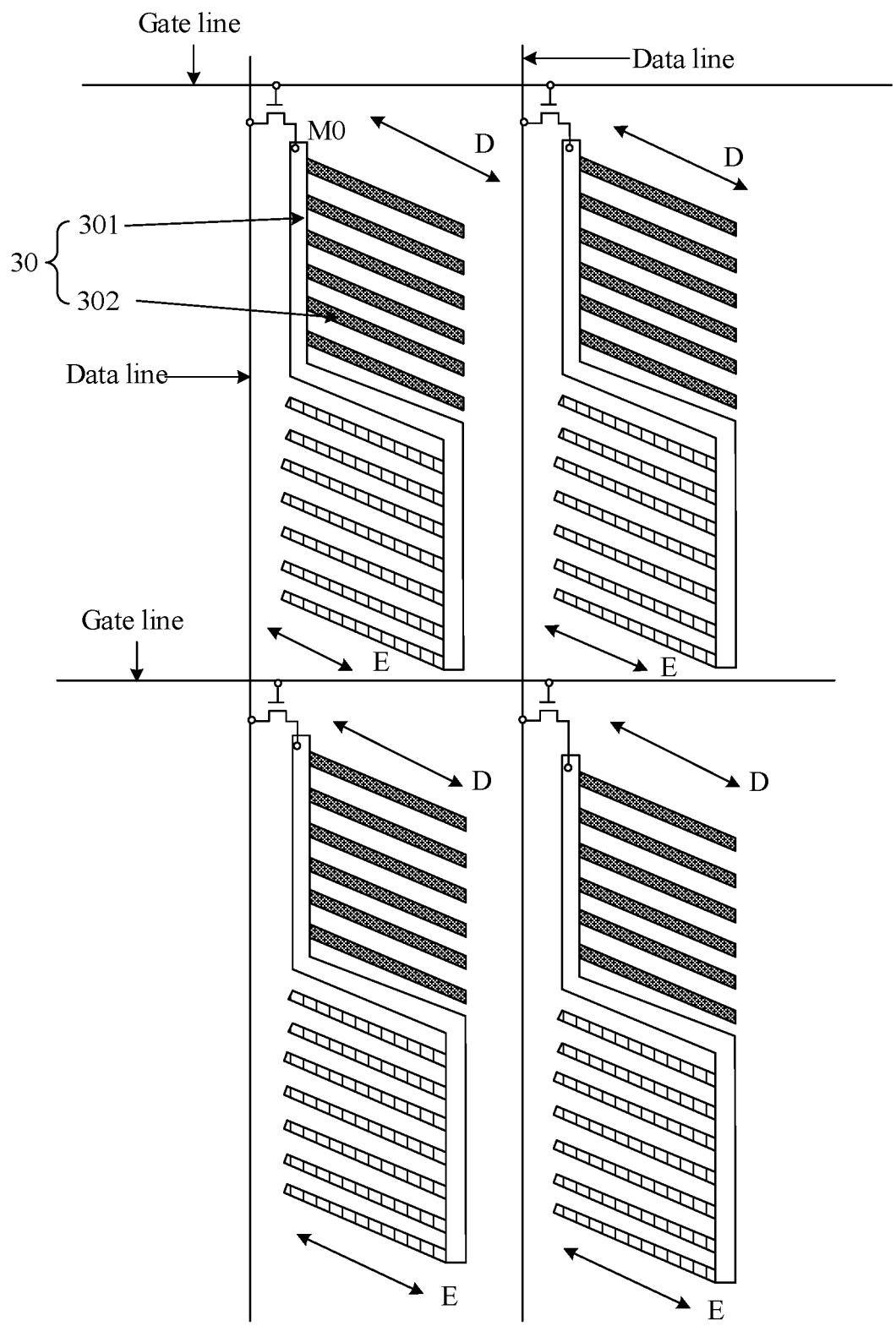
FIG. 23 is a structural schematic diagram of still another display panel according to an embodiment of the present disclosure.

Certainly, with reference to FIG. 23, in the case that the pixel electrode in the pixel structure 001 in the display panel 00 is the pixel electrode 30 shown in FIG. 6, since the extending directions of the second electrodes 302 in the pixel electrode 30 are the same (that is, the extending direction D of the first-type second electrodes 302a in the pixel electrode 30 shown in FIG. 6 is parallel to the extending direction E of the second-type second electrodes 302b in the pixel electrode 30 shown in FIG. 6), in order to facilitate alignment of liquid crystals in the liquid crystal layer, the extending directions of the second electrodes 302 of the pixel electrodes 30 in adjacent pixel structures 001 may be intersected with each other.

Figure 24:
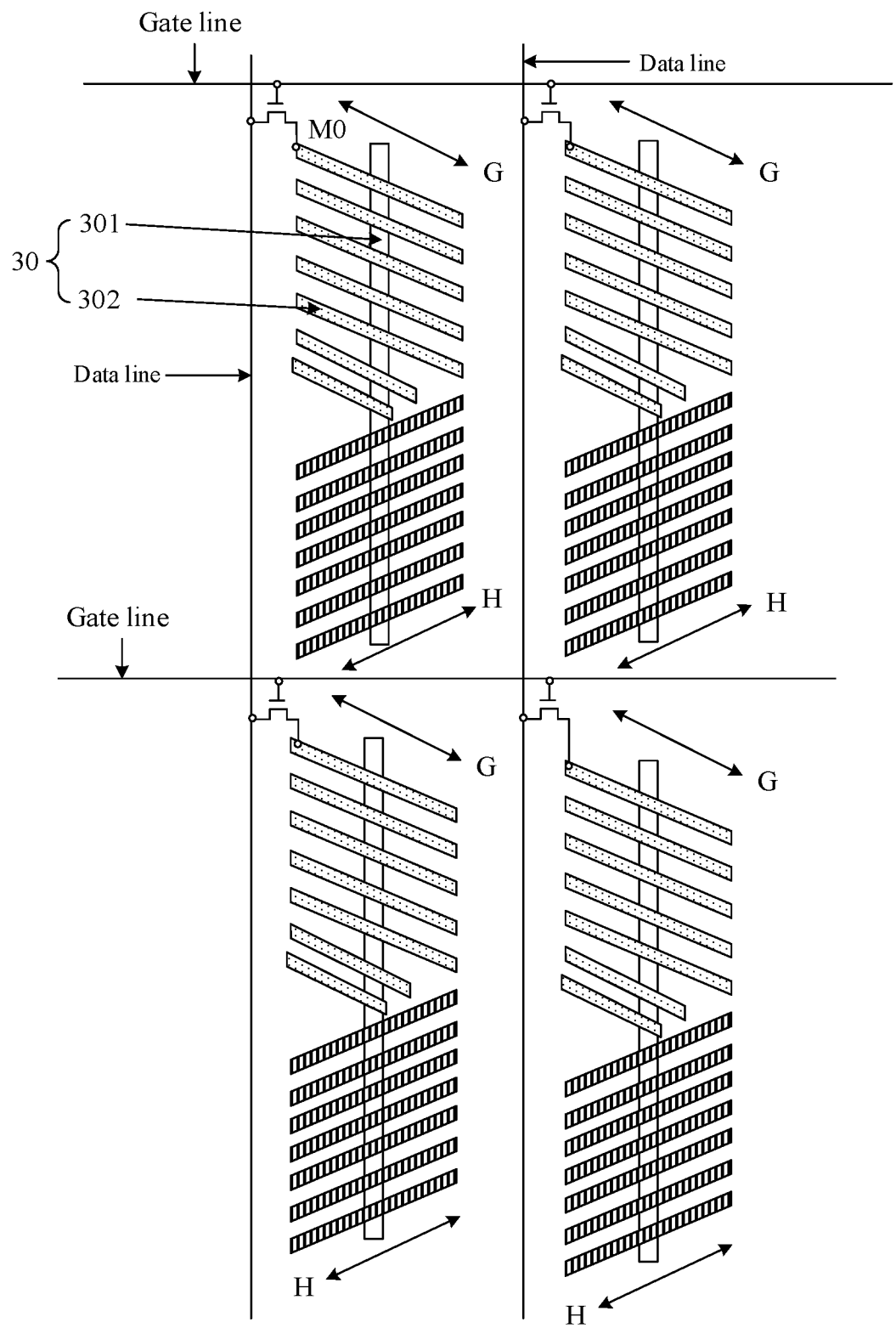
FIG. 24 is a structural schematic diagram of still another display panel according to an embodiment of the present disclosure.
Figure 25:
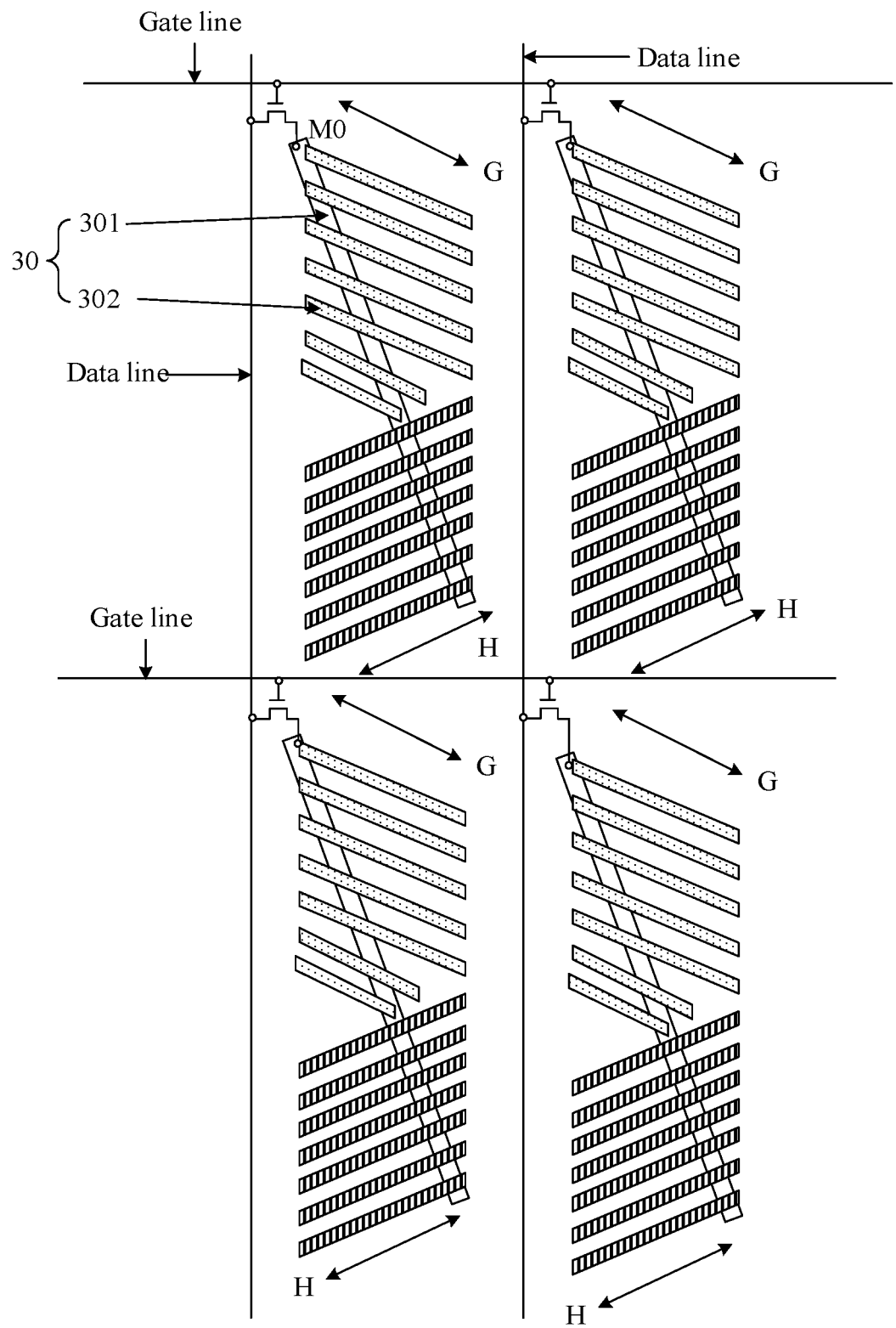
FIG. 25 is a structural schematic diagram of still another display panel according to an embodiment of the present disclosure.

FIG. 24 and FIG. 25 each show four pixel structures 001 in the display panel. The extending directions of the second electrodes 302 in the pixel electrode 30 in each pixel structure 001 are different (that is, in FIG. 24 and FIG. 25, for each pixel electrode 30, the extending direction G of the fourth-type second electrodes 302d in the pixel electrode 30 is intersected with the extending direction H of the fifth-type second electrodes 302e in the pixel electrode 30). Therefore, the liquid crystals in the liquid crystal layer may be aligned without making the extending directions of the second electrodes 302 in the pixel electrodes 30 in the adjacent pixel structures 30 intersected.

For example, with reference to FIG. 22 and FIG. 23, for two adjacent pixel structures 001, the extending direction of the fourth-type second electrodes 302d of the pixel electrode 30 in the first pixel structure 001 may be parallel to the extending direction of the fourth-type second electrodes 302d of the pixel electrode 30 in the second pixel structure 001, and the extending direction of the fifth-type second electrodes 302e of the pixel electrode 30 in the first pixel structure 001 may be parallel to the extending direction of the fifth-type second electrodes 302e of the pixel electrode 30 in the second pixel structure 001.

In the case that the pixel electrode in the pixel structure 001 in the display panel is the pixel electrode 30 shown in FIG. 5, FIG. 7, FIG. 8, or FIG. 9, the extending directions of the second electrodes in the pixel electrode 30 are different, and the liquid crystals in the liquid crystal layer may be aligned without making the extending directions of the second electrodes 302 in the pixel electrodes 30 in the adjacent pixel structures 30 intersected.

Figure 26:
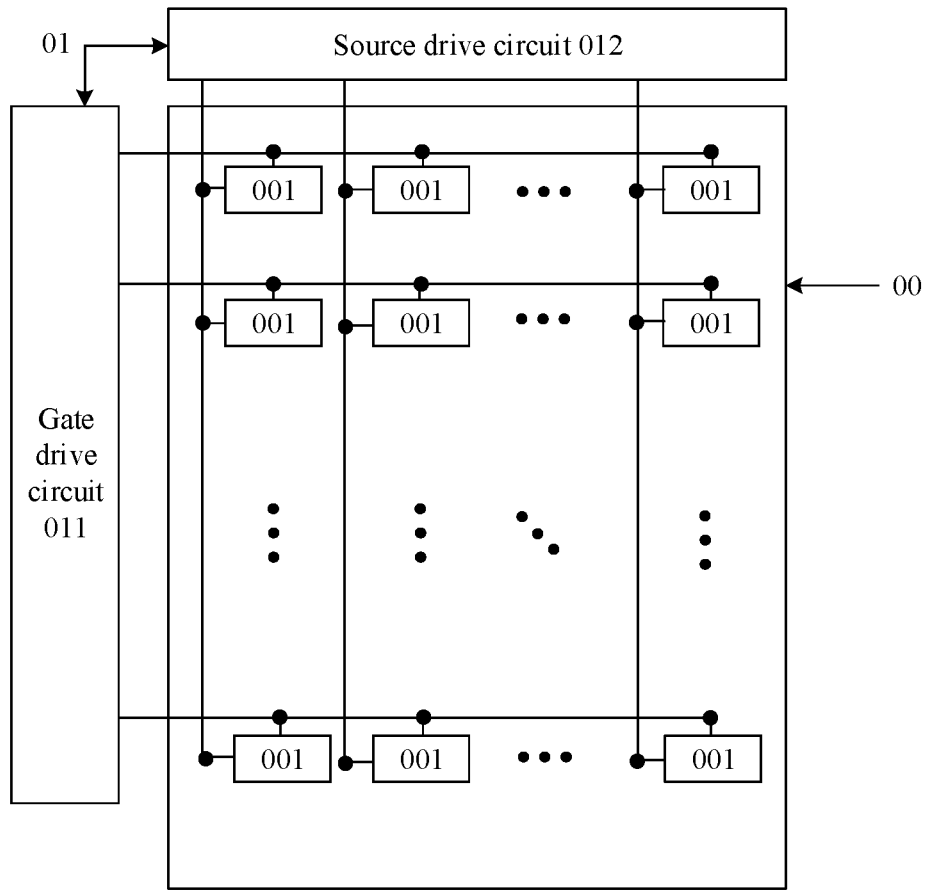
FIG. 26 is a structural schematic diagram of a display device according to an embodiment of the present disclosure.

FIG. 26 is a structural schematic diagram of a display device according to an embodiment of the present disclosure. With reference to FIG. 26, it can be seen that the display device may include a drive circuit 01 and the display panel 00 according to the above embodiment. The drive circuit 01 may be configured to provide a driving signal for the pixel structure 001 in the display panel 00.

With reference to FIG. 26, the drive circuit 01 may include a gate drive circuit 011 and a source drive circuit 012. The gate drive circuit 011 may be connected to each row of pixel structures 001 in the display panel 00 through a gate line, and configured to provide a gate driving signal for each row of pixel structures 001. The source drive circuit 012 may be connected to each column of pixel structures 001 in the display panel 00 through a data line, and configured to provide a data signal for each column of pixel structures 001.

Figure 27:
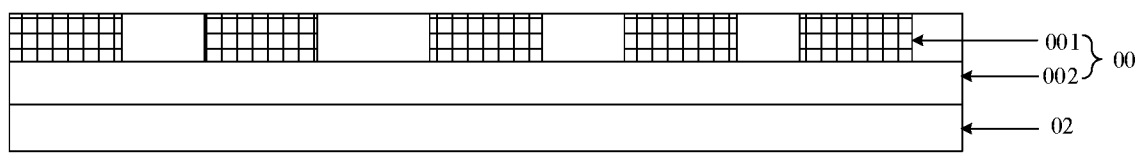
FIG. 27 is a structural schematic diagram of another display device according to an embodiment of the present disclosure.

FIG. 27 is a structural schematic diagram of another display device according to an embodiment of the present disclosure. With reference to FIG. 27, it can be seen that the display device may include a backlight source 02. The backlight source 02 may be disposed on the side, away from the pixel structure 001, of the base substrate 002. The backlight source 02 may be configured to provide backlight for the display panel 00.

Optionally, the display device may be any product or component having a display function such as a liquid crystal display device, electronic paper, an organic light-emitting diode (OLED) display device, an active-matrix organic light-emitting diode (AMOLED) display device, a mobile phone, a tablet computer, a television, a display, a laptop computer, a digital photo frame and a navigator.

The descriptions above are merely optional embodiments of the present disclosure, and are not intended to limit the present disclosure. Any modifications, equivalent substitutions, improvements and the like made within the spirit and principles of the present disclosure should be included within the protection scope of the present disclosure.

What is claimed is:

1. A pixel electrode, comprising:
a first electrode, the first electrode being a strip-shaped electrode; and
a plurality of second electrodes, wherein each of the second electrodes is a strip-shaped electrode and is connected to the first electrode, and the plurality of second electrodes are arranged along an extending direction of the first electrode;
wherein a length of the first electrode is greater than a length of any one of the second electrodes, and a width of the first electrode is greater than a width of any one of the second electrodes;
the first electrode comprises a first sub-electrode, a second sub-electrode, and a third sub-electrode, wherein one end of the first sub-electrode is connected to one end of the second sub-electrode, and the other end of the second sub-electrode is connected to one end of the third sub-electrode; and an extending direction of the second sub-electrode is intersected with an extending direction of the first sub-electrode and an extending direction of the third sub-electrode, and the first sub-electrode and the third sub-electrode are disposed on different sides of the second sub-electrode, and an angle between the extending direction of the first sub-electrode and the extending direction of the third sub-electrode is within an angle threshold range, the angle threshold range being 0-10 degrees; and the plurality of second electrodes comprise a plurality of first-type second electrodes and a plurality of second-type second electrodes, wherein one end of each of the first-type second electrodes is connected to the first sub-electrode; one end of each of the second-type second electrodes is connected to the third sub-electrode; and each of the first-type second electrodes is extended along a first direction, each of the second-type second electrodes is extended along a second direction, and the second direction is parallel to the extending direction of the second sub-electrode, the first direction being parallel to the second direction.

2. The pixel electrode according to claim 1, wherein the extending direction of the first sub-electrode is parallel to the extending direction of the third sub-electrode.

3. The pixel electrode according to claim 2, wherein the pixel electrode meets at least one of the following requirements:

a first angle between the second sub-electrode and the first sub-electrode is equal to a second angle between the second sub-electrode and the third sub-electrode;

or the first angle between the second sub-electrode and the first sub-electrode and the second angle between the second sub-electrode and the third sub-electrode are both greater than or equal to 90 degrees.

4. The pixel electrode according to claim 1, wherein an angle between the first direction and a gate line and an angle between the second direction and the gate line both range from 7 degrees to 20 degrees.

5. The pixel electrode according to claim 1, wherein the plurality of second electrodes further comprise a plurality of third-type second electrodes, wherein one end of each of the third-type second electrodes is connected to the second sub-electrode.

6. The pixel electrode according to claim 5, wherein the plurality of third-type second electrodes are disposed on a side, close to the first sub-electrode, of the second sub-electrode, the extending direction of the second sub-electrode is intersected with the first direction, and each of the third-type second electrodes is extended along a third direction, the third direction being parallel to the first direction; or, the plurality of third-type second electrodes are disposed on a side, close to the third sub-electrode, of the second sub-electrode, the extending direction of the second sub-electrode is intersected with the second direction, and each of the third-type second electrodes is extended along a third direction, and the third direction being parallel to the second direction.

7. The pixel electrode according to claim 1, wherein the first electrode is linear; and a middle portion or an end portion of each of the second electrodes is connected to the first electrode.

8. The pixel electrode according to claim 7, wherein the plurality of second electrodes comprise a plurality of fourth-type second electrodes and a plurality of fifth-type second electrodes, wherein each of the fourth-type second electrodes is extended along a fourth direction, and each of the fifth-type second electrodes is extended along a fifth direction, the fourth direction being intersected with or parallel to the fifth direction.

9. The pixel electrode according to claim 8, wherein an angle between the fourth direction and a gate line and an angle between the fifth direction and the gate line both range from 7 degrees to 20 degrees.

10. The pixel electrode according to claim 7, wherein the extending direction of the first electrode is parallel to or intersected with a data line.

11. The pixel electrode according to claim 1, wherein the width of the first electrode is greater than or equal to 2.3 μm and less than or equal to 3 μm, and the width of each of the second electrodes is greater than or equal to 1.3 μm and less than or equal to 2.2 μm.

12. A pixel structure, comprising a common electrode, a liquid crystal layer, and a pixel electrode, wherein the common electrode and the pixel electrode are configured to drive liquid crystals in the liquid crystal layer to deflect, and the pixel electrode comprises:

a first electrode, the first electrode being a strip-shaped electrode; and a plurality of second electrodes, wherein each of the second electrodes is a strip-shaped electrode and is connected to the first electrode, and the plurality of second electrodes are arranged along an extending direction of the first electrode;

wherein a length of the first electrode is greater than a length of any one of the second electrodes, and a width of the first electrode is greater than a width of any one of the second electrodes;

the first electrode comprises a first sub-electrode, a second sub-electrode, and a third sub-electrode, wherein one end of the first sub-electrode is connected to one end of the second sub-electrode, and the other end of the second sub-electrode is connected to one end of the third sub-electrode; and an extending direction of the second sub-electrode is intersected with an extending direction of the first sub-electrode and an extending direction of the third sub-electrode, and the first sub-electrode and the third sub-electrode are disposed on different sides of the second sub-electrode, and an angle between the extending direction of the first sub-electrode and the extending direction of the third sub-electrode is within an angle threshold range, the angle threshold range being 0-10 degrees; and the plurality of second electrodes comprise a plurality of first-type second electrodes and a plurality of second-type second electrodes, wherein one end of each of the first-type second electrodes is connected to the first sub-electrode; one end of each of the second-type second electrodes is connected to the third sub-electrode; and each of the first-type second electrodes is extended along a first direction, each of the second-type second electrodes is extended along a second direction, and the second direction is parallel to the extending direction of the second sub-electrode, the first direction being parallel to the second direction.

13. The pixel structure according to claim 12, wherein
the common electrode and the pixel electrode are disposed on a same side of the liquid crystal layer; and
the pixel electrode is disposed between the common electrode and the liquid crystal layer, or the common electrode is disposed between the pixel electrode and the liquid crystal layer.

14. The pixel structure according to claim 12, wherein the liquid crystals in the liquid crystal layer are negative liquid crystals.

15. A display panel, comprising a base substrate, and a plurality of pixel structures disposed on the base substrate;
wherein the pixel structure comprising a common electrode, a liquid crystal layer, and a pixel electrode, wherein
the common electrode and the pixel electrode are configured to drive liquid crystals in the liquid crystal layer to deflect,
and the pixel electrode comprises:
a first electrode, the first electrode being a strip-shaped electrode; and
a plurality of second electrodes, wherein each of the second electrodes is a strip-shaped electrode and is connected to the first electrode, and the plurality of second electrodes are arranged along an extending direction of the first electrode;
wherein a length of the first electrode is greater than a length of any one of the second electrodes, and a width of the first electrode is greater than a width of any one of the second electrodes;
the first electrode comprises a first sub-electrode, a second sub-electrode, and a third sub-electrode, wherein one end of the first sub-electrode is connected to one end of the second sub-electrode, and the other end of the second sub-electrode is connected to one end of the third sub-electrode; and an extending direction of the second sub-electrode is intersected with an extending direction of the first sub-electrode and an extending direction of the third sub-electrode, and the first sub-electrode and the third sub-electrode are disposed on different sides of the second sub-electrode, and an angle between the extending direction of the first sub-electrode and the extending direction of the third sub-electrode is within an angle threshold range, the angle threshold range being 0-10 degrees; and
the plurality of second electrodes comprise a plurality of first-type second electrodes and a plurality of second-type second electrodes, wherein one end of each of the first-type second electrodes is connected to the first sub-electrode; one end of each of the second-type second electrodes is connected to the third sub-electrode; and each of the first-type second electrodes is extended along a first direction, each of the second-type second electrodes is extended along a second direction, and the second direction is parallel to the extending direction of the second sub-electrode, the first direction being parallel to the second direction.

16. The display panel according to claim 15, wherein extending directions of a plurality of second electrodes in a pixel electrode in each of the pixel structures are the same, and the extending directions of the second electrodes in the pixel electrodes in two adjacent pixel structures are intersected with each other.

17. A display device, comprising a drive circuit and the display panel as defined in claim 15, wherein
the drive circuit is configured to provide a driving signal for a pixel structure in the display panel.

* * * * *